United States Patent
Yamano et al.

(10) Patent No.: US 11,068,063 B2
(45) Date of Patent: Jul. 20, 2021

(54) INFORMATION PROCESSING APPARATUS AND METHOD FOR ADJUSTING DETECTION INFORMATION BASED ON MOVEMENT IMPARTED BY A VIBRATOR

(71) Applicant: SONY CORPORATION, Tokyo (JP)

(72) Inventors: Ikuo Yamano, Tokyo (JP); Akihiro Komori, Tokyo (JP); Yusuke Nakagawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 100 days.

(21) Appl. No.: 15/542,192

(22) PCT Filed: Jan. 12, 2016

(86) PCT No.: PCT/JP2016/050735
§ 371 (c)(1),
(2) Date: Jul. 7, 2017

(87) PCT Pub. No.: WO2016/117417
PCT Pub. Date: Jul. 28, 2016

(65) Prior Publication Data
US 2018/0267616 A1    Sep. 20, 2018

(30) Foreign Application Priority Data
Jan. 23, 2015 (JP) .............................. JP2015-010968

(51) Int. Cl.
*G06F 3/01* (2006.01)
*G06F 3/038* (2013.01)
(Continued)

(52) U.S. Cl.
CPC ............. *G06F 3/017* (2013.01); *G06F 3/016* (2013.01); *G06F 3/0304* (2013.01); *G06F 3/038* (2013.01);
(Continued)

(58) Field of Classification Search
CPC ........ G06F 3/016; G06F 3/017; G06F 3/0304; G06F 3/033; G06F 3/0346; G06F 3/038;
(Continued)

(56) References Cited

U.S. PATENT DOCUMENTS 6,020,876 A * 2/2000 Rosenberg .............. G06F 3/011
345/157
6,252,579 B1 * 6/2001 Rosenberg .............. G06F 3/016
345/157
(Continued)

FOREIGN PATENT DOCUMENTS

JP    2004-070920 A    3/2004
JP    2004-0070920 A   3/2004
(Continued)

OTHER PUBLICATIONS

Oguchi, et al., "The Secret Ways to Make Use of Wii", Mac People, 2007, 22 pages.
(Continued)

*Primary Examiner* — Keith L Crawley
(74) *Attorney, Agent, or Firm* — Chip Law Group

(57) ABSTRACT

An information processing apparatus comprising: an acquiring portion that acquires driving information for controlling a driving device that imparts movement to an object; and an identifying portion that identifies information for determining a dictated position dictated by the object, on the basis of detection information obtained on the basis of movement detection of the object and the driving information acquired by the acquiring portion.

9 Claims, 21 Drawing Sheets

(51) Int. Cl.
*G06F 3/0346* (2013.01)
*G06F 3/03* (2006.01)

(52) U.S. Cl.
CPC ...... *G06F 3/0346* (2013.01); *G06F 2203/014* (2013.01); *G06F 2203/0384* (2013.01)

(58) Field of Classification Search
CPC .............. G06F 3/0383; G06F 2203/014; G06F 2203/0384; A63F 13/285; H04N 5/4403
See application file for complete search history.

(56) References Cited

U.S. PATENT DOCUMENTS

| | | | | |
|---|---|---|---|---|
| 6,704,002 | B1* | 3/2004 | Martin | A63F 13/06 345/161 |
| 2004/0021663 | A1 | 2/2004 | Suzuki et al. | |
| 2008/0010616 | A1* | 1/2008 | Algreatly | G06F 3/0346 715/856 |
| 2008/0134784 | A1* | 6/2008 | Jeng | G01P 15/18 73/514.01 |
| 2009/0017911 | A1* | 1/2009 | Miyazaki | A63F 13/06 463/37 |
| 2010/0033428 | A1* | 2/2010 | Ahn | G06F 3/0346 345/157 |
| 2010/0295667 | A1* | 11/2010 | Kyung | G06F 3/016 340/407.2 |
| 2011/0077082 | A1* | 3/2011 | Marks | A63F 13/213 463/36 |
| 2014/0015813 | A1* | 1/2014 | Numaguchi | G06T 17/00 345/184 |
| 2014/0104156 | A1* | 4/2014 | Touma | G06F 3/014 345/156 |
| 2016/0195930 | A1* | 7/2016 | Venkatesan | A63F 13/23 345/156 |
| 2017/0147068 | A1* | 5/2017 | Yamazaki | G06F 3/016 |

FOREIGN PATENT DOCUMENTS

| | | |
|---|---|---|
| JP | 2009-037582 A | 2/2009 |
| JP | 2009-289015 A | 12/2009 |
| WO | 2003/104967 A1 | 12/2003 |

OTHER PUBLICATIONS

"The Secret Ways to Make Use of Wii", Mac People, 2007, pp. 206-209.
International Search Report and Written Opinion of PCT Application No. PCT/JP2016/050735, dated Apr. 5, 2016, 1 page of English Translation and 5 pages of ISRWO.

* cited by examiner

INFORMATION PROCESSING APPARATUS AND METHOD FOR ADJUSTING DETECTION INFORMATION BASED ON MOVEMENT IMPARTED BY A VIBRATOR

CROSS REFERENCE TO RELATED APPLICATIONS

This application is a U.S. National Phase of International Patent Application No. PCT/JP2016/050735 filed on Jan. 12, 2016, which claims priority benefit of Japanese Patent Application No. JP 2015-010968 filed in the Japan Patent Office on Jan. 23, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, devices that operate on the basis of a gesture of a user are being used to realize intuitive operation.

Patent Literature 1, for example, describes technology that uses a device that determines a gesture of a user by detecting a change in posture, and transmits a control signal on the basis of the gesture of the user.

CITATION LIST

Patent Literature

Patent Literature 1: JP 2009-37582A

DISCLOSURE OF INVENTION

Technical Problem

With technology that uses a device that operates on the basis of a gesture of a user, however, it is often difficult to realize a function in accordance with the intention of the user. For example, with the technology described in Patent Literature 1, when vibration is imparted to the user in order to increase a sense of realism or the like, it is difficult to realize a function in accordance with the intention of the user because the detected posture of the device may be affected by the vibration.

Therefore, the present disclosure proposes an information processing apparatus, an information processing method, and a program which are novel and improved, and which enable a function in accordance with an intention of a user to be realized.

Solution to Problem

According to the present disclosure, there is provided an information processing apparatus including: an acquiring portion that acquires driving information for controlling a driving device that imparts movement to an object; and an identifying portion that identifies information for determining a dictated position dictated by the object, on the basis of detection information obtained on the basis of movement detection of the object and the driving information acquired by the acquiring portion.

Further, according to the present disclosure, there is provided an information processing method including: acquiring driving information for controlling a driving device that imparts movement to an object with an information processing apparatus; and identifying information for determining a dictated position dictated by the object, on the basis of detection information obtained on the basis of movement detection of the object and the acquired driving information.

Further, according to the present disclosure, there is provided a program for causing a computer that controls an information processing apparatus to function as: an acquiring portion that acquires driving information for controlling a driving device that imparts movement to an object; and an identifying portion that identifies information for determining a dictated position dictated by the object, on the basis of detection information obtained on the basis of movement detection of the object and the driving information acquired by the acquiring portion.

Advantageous Effects of Invention

As described above, according to the present disclosure, a function in accordance with an intention of a user is able to be realized.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
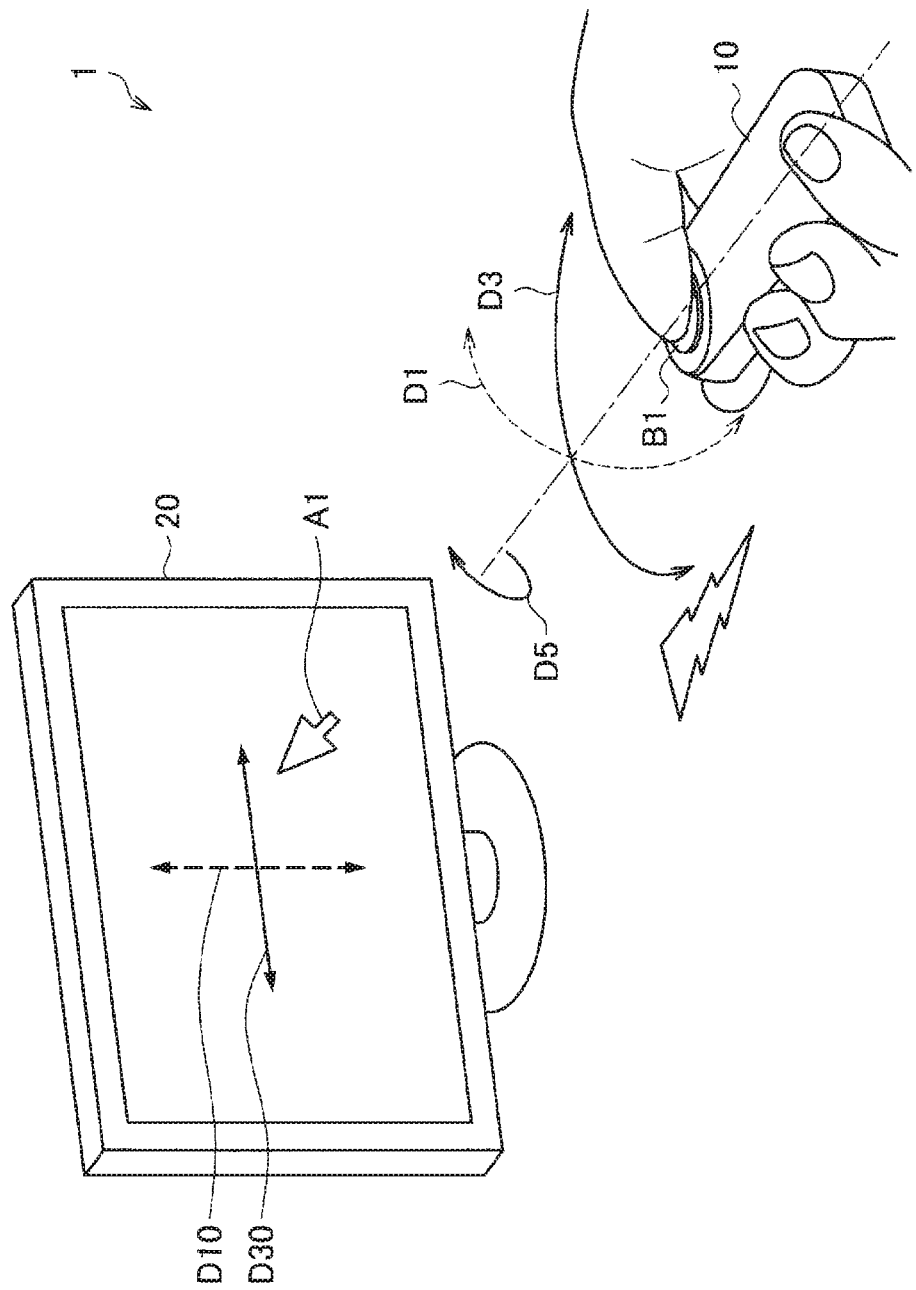
FIG. 1 is an explanatory view illustrating a specific example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Outline of an information processing system according to an embodiment of the present disclosure
2. Dictating device according to a first embodiment
2-1. First comparative example
2-2. Functional configuration
2-3. Operation
2-4. Application example
3. Dictating device according to a second embodiment
3-1. Second comparative example
3-2. Functional configuration
3-3. Operation
4. Dictating device according to a third embodiment
4-1. Functional configuration
4-2. Operation
4-3. Modified example
5. Hardware configuration
6. Summary

1. Outline of an Information Processing System According to an Embodiment of the Present Disclosure First, an outline of an information processing system 1 according to an embodiment of the present disclosure will be described with reference to FIGS. 1 to 3.

FIG. 1 is an explanatory view illustrating a specific example of an information processing system 1 according to an embodiment of the present disclosure. The information processing system 1 includes a dictating device 10 and a display device 20, as shown in FIG. 1.

The dictating device 10 is one example of the information processing apparatus according to the present disclosure. The dictating device 10 is used in a state held by a user, and controls a display position of a cursor A1 displayed on a screen of the display device 20 in accordance with movement of a hand of the user. More specifically, the dictating device 10 controls the display position of the cursor A1 by transmitting information for determining a dictated position on the screen, which is dictated by the dictating device 10, to the display device 20. The dictating device 10 also controls the display position of the cursor A1 in accordance with the movement of the hand of the user, by detecting movement in a pitch direction D1 and a yaw direction D3 of the dictating device 10.

The dictating device 10 may also control the display position of the cursor A1 on the basis of movement detection in a roll direction D5 and a translational direction of the dictating device 10. For example, the dictating device 10 detects movement in the translational direction of the dictating device 10 by recognizing a specific object, e.g., a marker, that is part of the dictating device 10 from an image obtained by taking an image using an imaging device, not shown, and calculating a position in space of the dictating device 10 on the basis of the position and size of the marker recognized in the obtained image.

Information for determining the dictated position transmitted by the dictating device 10 may be information directly indicating the dictated position on the screen, for example. The information for determining the dictated position transmitted by the dictating device 10 may also be information indicative of the angle or angular velocity in the pitch direction D1 and the yaw direction D3 of the dictating device 10.

Also, the dictating device 10 includes a vibrator that makes the dictating device 10 vibrate. The vibrator is controlled by the display device 20. For example, the vibrator is driven by the display device 20 in accordance with an operation by the user with respect to the dictating device 10, so as to make the dictating device 10 vibrate. As a result, various information is able to be conveyed to the user.

The dictating device 10 also includes a button B1 that receives a command from the user, and transmits information as to whether the button B1 is being pressed by the user to the display device 20. The details of the dictating device 10 will be described in the following sections.

The display device 20 has a screen that displays an image. The display device 20 displays various images on the screen. The display device 20 also displays the cursor A1, the display position of which is controlled by the dictating device 10, on the screen. For example, the cursor A1 moves in a Y axis direction D10 and an X axis direction D30 on the screen in accordance with movement of the dictating device 10 in the pitch direction D1 and the yaw direction D3, respectively. The display device 20 may also additionally display various widgets on the screen. Consequently, the user is able to make the display device 20 perform various functions by operating the dictating device 10. Hereinafter, a configuration of the display device 20 will be described with reference to FIG. 2.

Figure 2:
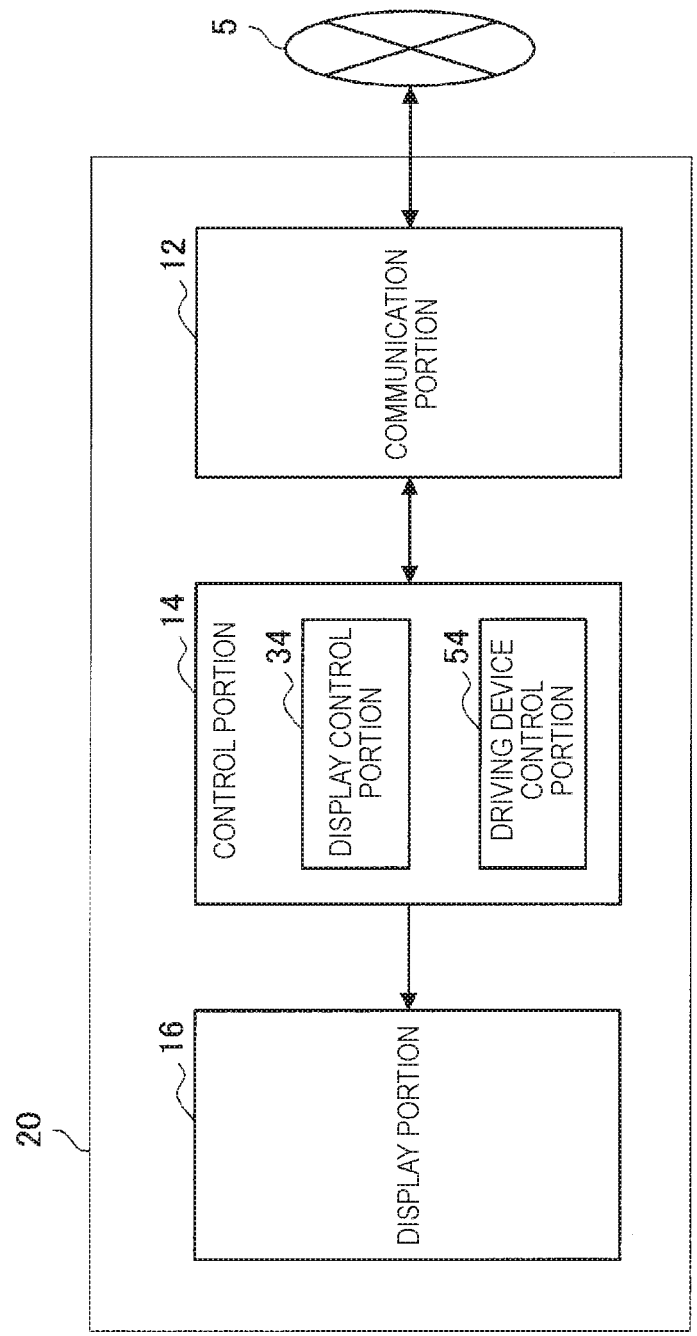
FIG. 2 is an explanatory view illustrating a specific example of a configuration of a logical function of a display device according to an embodiment of the present disclosure.

FIG. 2 is an explanatory view illustrating a specific example of a configuration of a logical function of the display device 20. As shown in FIG. 2, the display device 20 includes a communication portion 12, a control portion 14, and a display portion 16.

The communication portion 12 communicates with a device outside of the display device 20. For example, the communication portion 12 communicates with the dictating device 10 via a wired or wireless information network 5. The communication portion 12 also outputs information for determining the dictated position received by the communication portion 12 and information as to whether the button B1 is being pressed by the user, to the control portion 14. In addition, the communication portion 12 transmits driving information for controlling the vibrator to the dictating device 10.

The control portion 14 includes a display control portion 34 and a vibrating unit control portion 54, and controls various processing performed by the display device 20.

The display control portion 34 displays various images on the display portion 16. For example, the display control portion 34 determines the dictated position on the screen, which is dictated by the dictating device 10, on the basis of the information for determining the dictated position input by the communication portion 12, and displays the cursor A1 in the determined dictated position. If the information for determining the dictated position is information that directly indicates the dictated position on the screen, the display control portion 34 determines the position indicated by the information to be the dictated position. On the other hand, if the information for determining the dictated position is not information that directly indicates the dictated position on the screen, the display control portion 34 determines the dictated position by performing a conversion process on the information for determining the dictated position.

The vibrating unit control portion 54 controls the vibrator by transmitting the driving information for controlling the vibrator to the communication portion 12. For example, the vibrating unit control portion 54 controls the vibrator in accordance with an operation of the dictating device 10 by the user. More specifically, the vibrating unit control portion 54 may drive the vibrator when a specific push button displayed on the screen is selected. The vibrating unit control portion 54 may also cause the vibrator to vibrate at a frequency in accordance with a push button selected from among a plurality of push buttons displayed on the screen.

Also, the vibrating unit control portion 54 may drive the vibrator when the cursor A1 is displayed at a specific position. Moreover, the vibrating unit control portion 54 may control the vibration intensity of the vibrator in accordance with the display position of the cursor A1. More specifically, when the cursor A1 is displayed at a position crowded with objects that are able to be selected by the cursor A1, the vibrating unit control portion 54 may control the vibrator such that the amplitude of the vibration of the vibrator is greater than the amplitude of vibration of the vibrator when the cursor A1 is displayed in a position that is less crowded with objects that are able to be selected by the cursor A1.

Also, in an example in which the vibrator is driven when the cursor A1 is displayed at a specific position, the vibrating unit control portion 54 may control the vibrator in accordance with the moving direction of the cursor A1. More specifically, the vibrating unit control portion 54 may control the vibrator such that movement applied in a rotational direction of the dictating device 10 that corresponds to the advancing direction of the cursor A1 is reduced compared to movement applied in a rotational direction of the dictating device 10 that corresponds to a direction opposite the advancing direction of the cursor.

The display portion 16 displays various images on the screen. For example, the display portion 16 displays the cursor A1 at a dictated position determined by the display control portion 34. This function is realized by, for example, a cathode ray tube (CRT) display device, a liquid crystal display (LCD) device, an organic light emitting diode (OLED) device, or a projector device.

Figure 3:
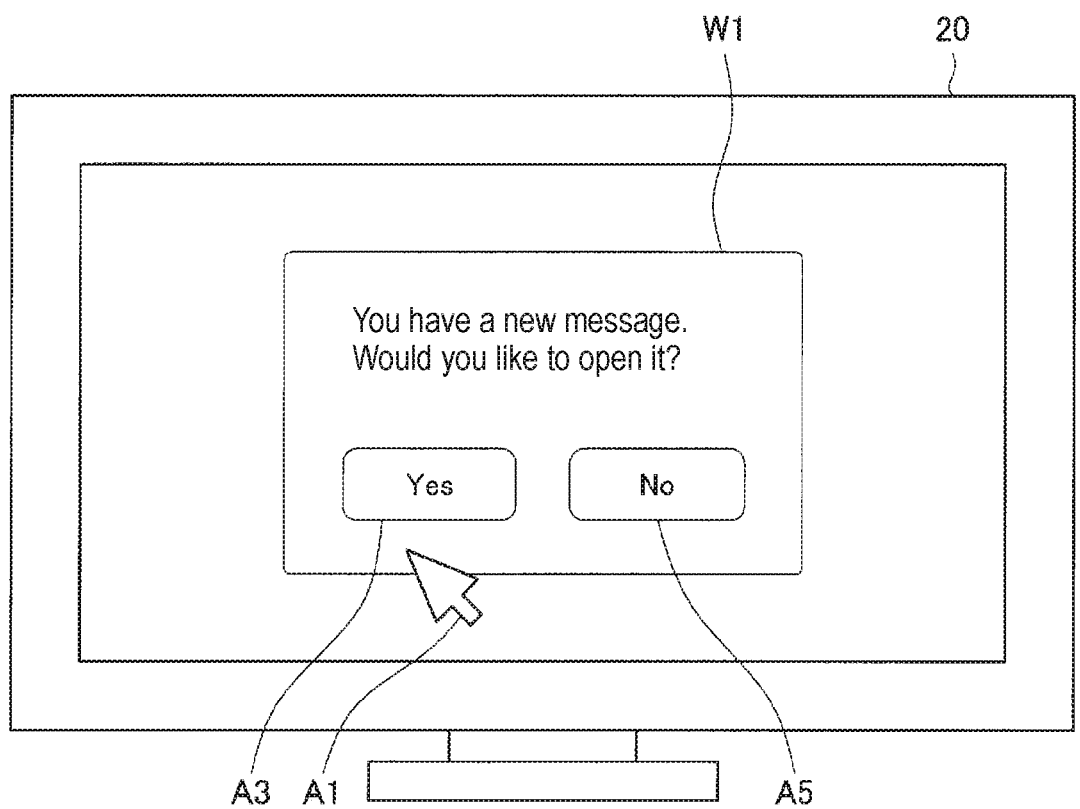
FIG. 3 is an explanatory view illustrating a specific example of a window displayed on a display device.

The display portion 16 may also additionally display various widgets on the screen. For example, the display portion 16 may display a window W1 within which a YES button A3 and a NO button A5 are displayed, as shown in FIG. 3. The user is able to select whether to view a new message by moving the cursor A1 into a display area of the YES button A3 or the NO button A5, and operating the button B1 of the dictating device 10.

The functions of the communication portion 12 and the control portion 14, and the function of the display portion 16, may each be realized by different devices, respectively. In this case, the devices communicate with each other via a wired or wireless communication network over which communication is possible.

2. Dictating Device According to a First Embodiment

In the preceding section, the outline of the information processing system 1 according to an embodiment of the present disclosure was described. Next, a dictating device 10-1 according to a first embodiment of the present disclosure will be described with reference to FIGS. 4A, 4B, 4C, 4D, 6A, 6B, 6C, 6D, 6E, FIG. 7, FIG. 8 and FIG. 9. In this section, an example will be described in which the display device 20 drives the vibrator for a certain period of time when the button B1 of the dictating device 10 is pressed while the cursor A1 is positioned in a display area of the YES button A3 or the NO button A5 shown in FIG. 3. Also in this section, an example will be described in which the display device 20 determines that the user has selected YES or NO when the button B1 of the dictating device 10 is released after being pressed, while the cursor A1 is positioned in the display area of the YES button A3 or the NO button A5.

2-1. First Comparative Example

In order to clarify the technical significance of the dictating device 10-1 according to the first embodiment of the present disclosure, a first comparative example will first be described, after which the dictating device 10-1 according to the first embodiment of the present disclosure will be described in detail.

FIGS. 4A, 4B, 4C and 4D are explanatory views illustrating an effect that the driving of the vibrator has on the dictated position. In FIGS. 4A, 4B, 4C and 4D are explanatory views, the angular velocity in the pitch direction D1 is given as an example of a component of the angular velocity, and a Y coordinate of the dictated position is given as an example of a component of the dictated position.

Figure 4A:
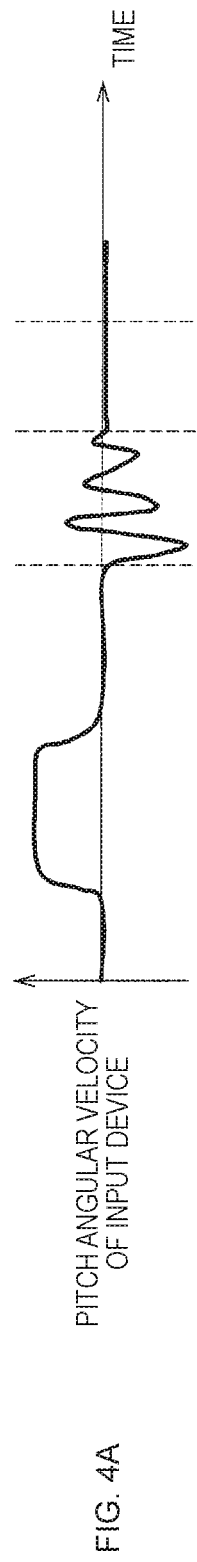
FIGS. 4A, 4B, 4C and 4D are explanatory views illustrating an effect that the driving of a vibrator has on a dictated position, in a first comparative example.
Figure 4B:
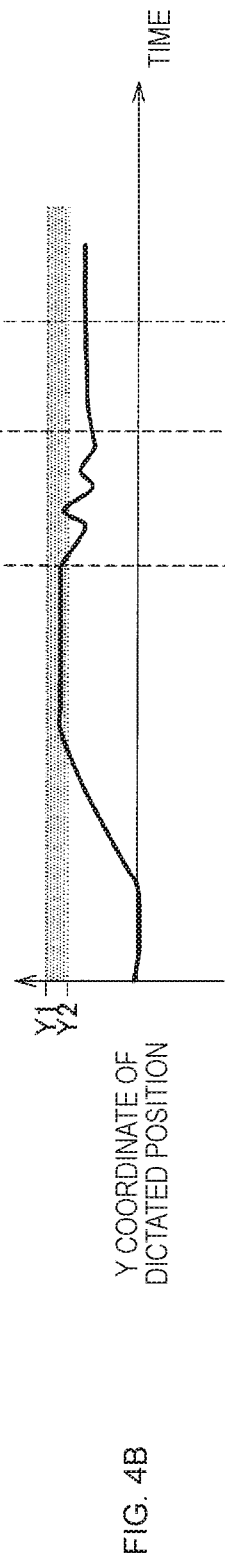
Figure 4C:
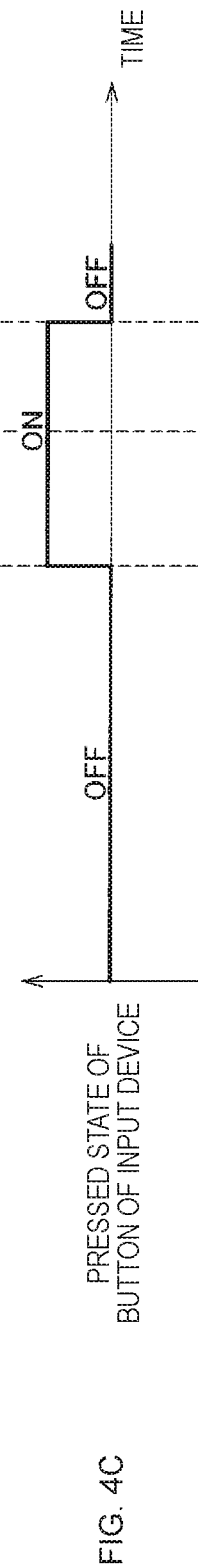
Figure 4D:
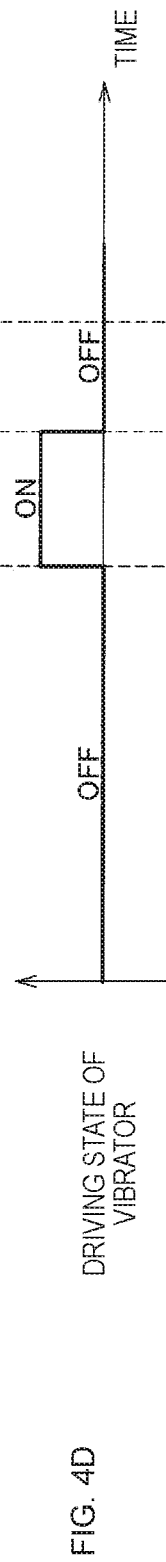

FIG. 4A shows a change over time in the angular velocity in the pitch direction D1 of the dictating device 10 in the information indicative of the angular velocity in the pitch direction D1 of the dictating device 10 acquired by the dictating device 10. FIG. 4B shows a change over time in the Y coordinate of the dictated position determined by the display device 20. In FIG. 4B, Y1 and Y2 are Y coordinates of an upper end and a lower end of the display area of the YES button A3 or the NO button A5 in FIG. 3, respectively. FIG. 4C shows a change over time in a pressed state of a button of the dictating device 10. FIG. 4D shows a change over time in the driving state of the vibrator.

When a button of the dictating device 10 is pressed while the cursor A1 is in the display area of the YES button A3 or the NO button A5 in FIG. 3, at time T11, as shown in B and C of FIGS. 4B and 4C, the vibrator is driven for a certain period of time (from time T11 to time T12), as shown in Def FIG. 4D. Also, the dictating device 10 is made to vibrate by the vibrator, and a change over time in the angular velocity in the pitch direction D1 of the dictating device 10 exhibits a vibration waveform, as shown in FIG. 4A.

Also, the cursor A1 in FIG. 3 moves in accordance with the change over time in the dictated position shown in FIG. 4B. As a result, the cursor A1 is positioned outside the display area of the YES button A3 or the NO button A5 at time T13, at which time the pressing of the button B1 of the dictating device 10 is released, as shown in FIGS. 4B and 4C. Consequently, the display device 20 does not determine that YES or NO has been selected by the user.

As described above, in the first comparative example, an unexpected fluctuation in the dictated position occurs due to the driving of the vibrator in response to a command input by the user. Consequently, the selection operation by the user is not recognized. Therefore, in the first comparative example, it is difficult to realize a function in accordance with the intention of the user.

Also, if acceleration of the dictating device 10 imparted by the vibrator exceeds a reference value of a sensor, the acceleration of the dictating device 10 is not accurately detected, so the amount of fluctuation in the dictated position may be greater than the fluctuation when the acceleration of the dictating device 10 is accurately detected. Such detection error may also adversely affect the realization of a function in accordance with the intention of the user.

2-2. Functional Configuration

Continuing on, a configuration of a logical function of the dictating device 10-1 according to the first embodiment of the present disclosure that is capable of realizing an operation in accordance with the intention of the user will be described with reference to FIGS. 5 and 6A, 6B, 6C, 6D and 6E.

Figure 5:
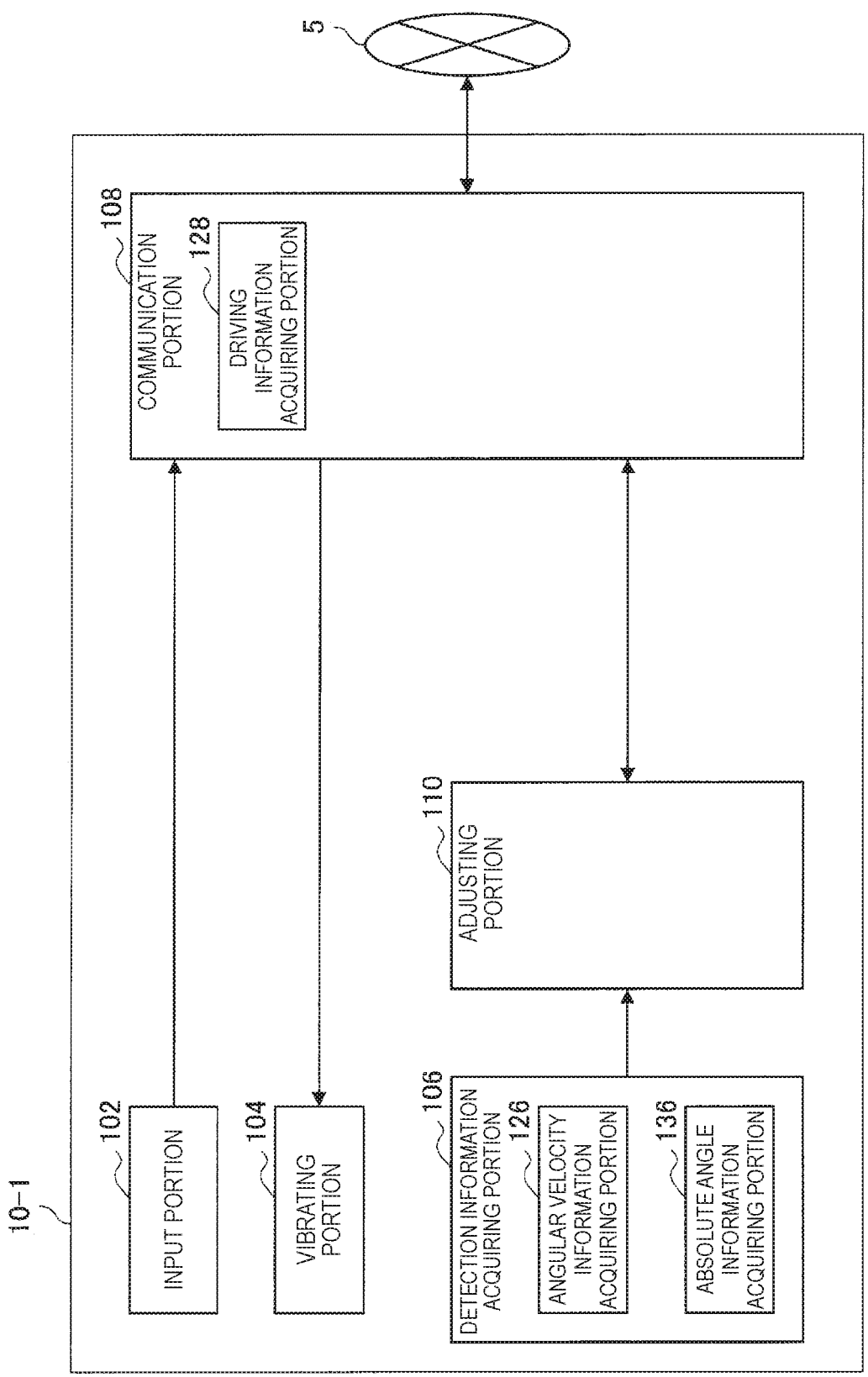
FIG. 5 is an explanatory view illustrating a specific example of a configuration of a logical function of a dictating device according to a first embodiment of the present disclosure.

FIG. 5 is an explanatory view illustrating a specific example of a configuration of a logical function of the dictating device 10-1 according to the first embodiment of the present disclosure. The dictating device 10-1 includes an input portion 102, a vibrating portion 104, a detection information acquiring portion 106, a communication portion 108, and an adjusting portion 110, as shown in FIG. 5.

(Input Portion)

The input portion 102 receives a command from the user. The function of the input portion 102 is realized by the button B1 shown in FIG. 1, for example. The function of the input portion 102 may also be realized by an input device such as a touch sensor or a switch. The input portion 102 outputs information indicative of the received command to the communication portion 108.

(Vibrating Portion)

The vibrating portion 104 imparts vibration to the dictating device 10-1 in accordance with driving information input from a driving information acquiring portion 128. The function of the vibrating portion 104 is realized by, for example, a vibrator that vibrates in accordance with the input driving information, such as an eccentric rotating mass (ERM), a linear resonant actuator (LRA), or a voice coil motor (VCM). The vibrator is merely one example of a driving device that imparts movement to the dictating device 10-1. A driving device that imparts movement other than vibration (e.g., movement by a haptic presentation in haptic technology) to the dictating device 10-1 may also be applied to the vibrating portion 104.

Notification of various information to the user may also be realized by a driving device outside the dictating device 10-1. In this case, the vibrating portion 104 may be omitted from the internal configuration of the dictating device 10-1. For example, an external driving device that notifies the user of various information may also be a vibrator that is worn on an arm or a leg or the like of the user, a trapezoidal vibrator that the user gets on, or a device that imparts vibration to the user through a medium such as air. These devices may also impart movement to the dictating device 10-1 that is held by the user. Moreover, when notification of various information to the user is realized by a driving device outside the dictating device 10-1, the display device 20 transmits the driving information to the dictating device 10-1 and the driving device outside the dictating device 10-1.

(Detection Information Acquiring Portion)

The detection information acquiring portion 106 includes an angular velocity information acquiring portion 126 and an absolute angle information acquiring portion 136. The detection information acquiring portion 106 acquires detection information on the basis of movement detection of the dictating device 10-1, and outputs the acquired detection information to the adjusting portion 110.

The angular velocity information acquiring portion 126 acquires information indicative of the angular velocity of the dictating device 10-1 on the basis of movement detection of the dictating device 10-1, as detection information. The function of the angular velocity information acquiring portion 126 is realized by a gyro sensor, for example. More specifically, the angular velocity information acquiring portion 126 acquires, as detection information, information indicative of the angular velocity in the pitch direction D1 and the yaw direction D3 of the dictating device 10-1 on the basis of movement detection of the dictating device 10-1 by the gyro sensor.

The absolute angle information acquiring portion 136 acquires information indicative of the absolute angle of the dictating device 10-1 on the basis of movement detection of the dictating device 10-1, as detection information. The function of the absolute angle information acquiring portion 136 is realized by an acceleration sensor and a geomagnetic sensor, for example. More specifically, the absolute angle information acquiring portion 136 acquires information indicative of the absolute angle in the pitch direction D1 and the yaw direction D3 of the dictating device 10-1 on the basis of movement detection of the dictating device 10-1 by the acceleration sensor and the geomagnetic sensor, respectively.

The detection information acquiring portion 106 may also acquire information indicative of the angle of the dictating device 10-1, as detection information, by accumulating information indicative of the angular velocity of the dictating device 10-1 acquired by the angular velocity information acquiring portion 126. The detection information acquiring portion 106 may also acquire, as detection information, information indicative of the absolute angle and information indicative of the angular velocity in the roll direction D5 of the dictating device 10-1, as well as information indicative of the position in the translational direction of the dictating device 10-1, on the basis of movement detection in the roll direction D5 and the translational direction of the dictating device 10-1.

(Communication Portion)

The communication portion 108 communicates with a device outside of the directing device 10-1. More specifically, the communication portion 108 communicates with the display device 20 via a wired or wireless information network 5. For example, the communication portion 108 transmits information indicative of a command input from the input portion 102 and information for determining a dictated position input from the adjusting portion 110, to the display device 20. The communication portion 108 also includes the driving information acquiring portion 128 that acquires the driving information transmitted from the display device 20. The driving information acquiring portion 128 outputs the acquired driving information to the vibrating portion 104 and the adjusting portion 110. The communication portion 108 may also communicate directly with the display device 20 via the information network 5.

(Adjusting Portion)

The adjusting portion 110 functions as an identifying portion that identifies information for determining the dictated position dictated by the dictating device 10-1, on the basis of the detection information input from the detection information acquiring portion 106 and the driving information input from the driving information acquiring portion 128. The adjusting portion 110 also outputs the identified information for determining the dictated position to the communication portion 108. The driving information input from the driving information acquiring portion 128 includes, for example, information as to whether the vibrator is vibrating, and the adjusting portion 110 identifies information for determining the dictated position, by adjusting the detection information while the vibrating is vibrating.

For example, the adjusting portion 110 adjusts the information indicative of the angular velocity of the dictating device 10-1 while the vibrator is vibrating. The adjusting portion 110 then acquires information indicative of the angle of the dictating device 10-1 by performing an integration operation on the adjusted information indicative of the angular velocity of the dictating device 10-1. Then, the adjusting portion 110 identifies information that directly indicates the dictated position on the screen on the basis of the acquired information indicative of the angle of the dictating device 10-1. The adjusting portion 110 may also identify information that directly indicates the dictated position on the screen after correcting the acquired angle information of the dictating device 10-1 using the information indicative of the absolute angle of the dictating device 10-1.

In the first embodiment, adjusting portion 110 identifies information for determining the dictated position by reducing the amount of change in the detection information while the vibrator is vibrating. For example, the adjusting portion 110 identifies information that directly indicates the dictated position on the screen, by reducing the amount of change in the information indicative of the angular velocity of the dictating device 10-1 while the vibrator is vibrating. A setting value of the degree to which the amount of change in the detection information is reduced by the adjusting portion 110 may also be able to be changed. Also, the amount of change in the detection information may be set to zero by reducing the amount of change in the detection information.

The adjusting portion 110 may also identify information for determining the dictated position, by adjusting the detection information by a degree corresponding to the detection direction of the movement detection of the dictating device 10-1 by the detection information acquiring portion 106. For example, the adjusting portion 110 may reduce the amount of change in the information indicative of the angular velocity in the pitch direction D1 while the vibrator is being driven, by a greater degree than the amount of change in the information indicative of the angular velocity in the yaw direction D3.

Figure 6:
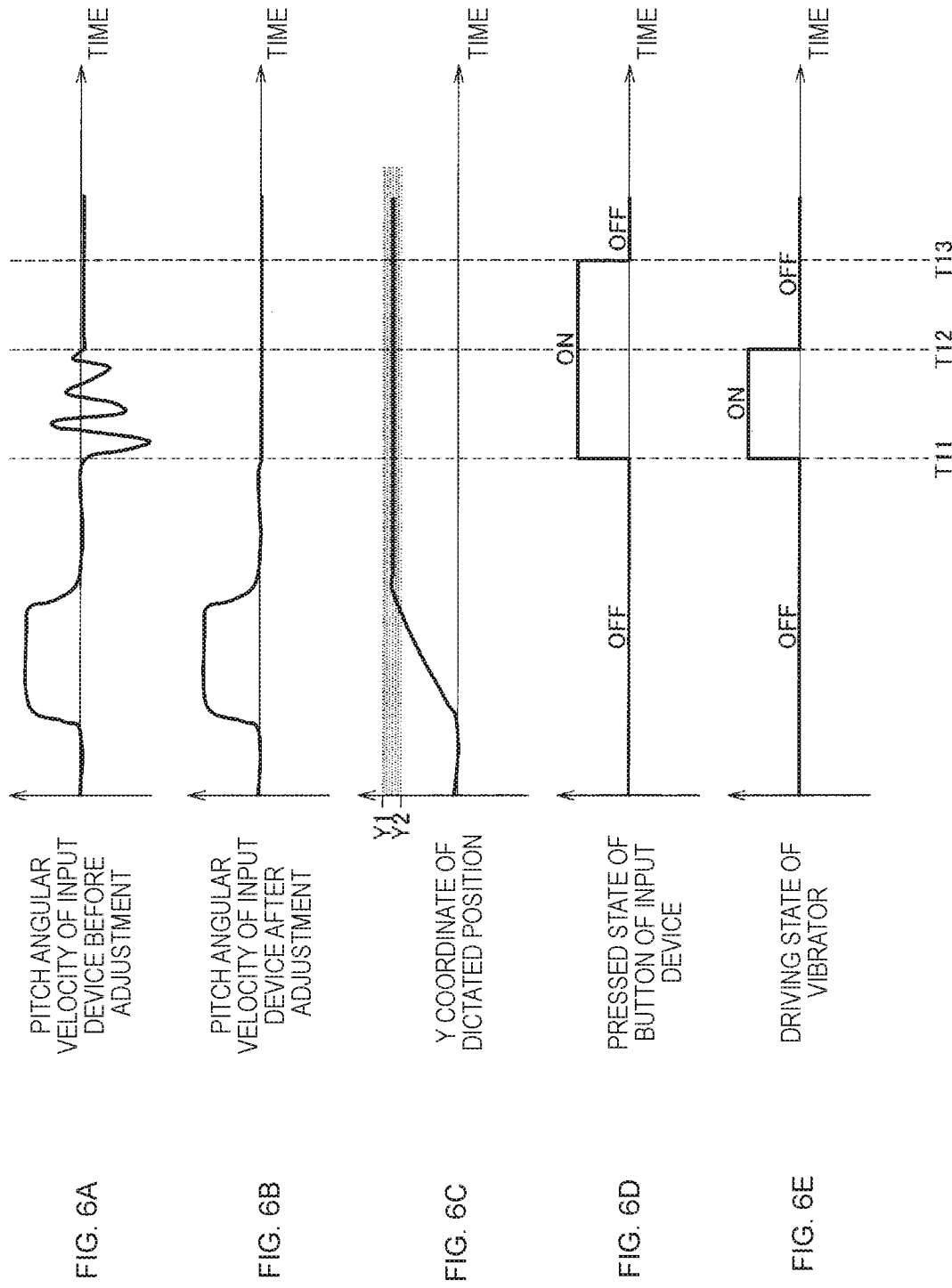
FIGS. 6A, 6B, 6C, 6D and 6E are explanatory views illustrating a specific example of a detection information adjustment process performed by the dictating device according to the first embodiment of the present disclosure.

FIGS. 6A, 6B, 6C, 6D and 6E are explanatory views illustrating a specific example of a detection information adjustment process performed by the adjusting portion 110. In FIGS. 6A, 6B, 6C, 6D and 6E, the angular velocity in the pitch direction D1 is given as an example of a component of the angular velocity, and the Y coordinate of the dictated position is given as an example of a component of the dictated position. FIG. 6A shows a change over time in the angular velocity in the pitch direction D1 of the dictating device 10-1 in information indicative of the angular velocity in the pitch direction D1 of the dictating device 10-1 acquired by the detection information acquiring portion 106. FIG. 6B shows a change over time in the angular velocity in the pitch direction D1 of the dictating device 10-1 in the information indicative of the angular velocity in the pitch direction D1 adjusted by the adjusting portion 110. FIG. 6C shows a change over time in the Y coordinate of the dictated position in the information that directly indicates the dictated position on the screen identified by the adjusting portion 110. Also, in FIG. 6C, Y1 and Y2 are Y coordinates of an upper end and a lower end of the display area of the YES button A3 or the NO button A5 in FIG. 3, respectively. Def FIG. 6D shows a change over time in a pressed state of the button B1 of the dictating device 10-1. FIG. 6E shows a change over time in the driving state of the vibrator.

When the button B1 of the dictating device 10-1 is pressed while the cursor A1 is in the display area of the YES button A3 or the NO button A5 in FIG. 3, at time T11, as shown in FIGS. 6C and 6D, the vibrator is driven for a certain period of time (from time T11 to time T12), as shown in FIG. 6E. The dictating device 10-1 is then vibrated by the vibrator, and the change over time in the angular velocity in the pitch direction D1 of the dictating device 10-1 in the information indicative of the angular velocity in the pitch direction D1 of the dictating device 10-1 acquired by the detection information acquiring portion 106 exhibits a vibration waveform, as shown in FIG. 6A.

Also, according to the first embodiment, the adjusting portion 110 reduces the amount of change in the information indicative of the angular velocity in the pitch direction D1 while the vibrator is being driven. For example, the angular velocity in the pitch direction D1 of the dictating device 10-1 in the adjusted information indicative of the angular velocity in the pitch direction D1 is a constant value from time T11 to time T12, as shown in FIG. 6B. Also, the angular velocity in the pitch direction D1 after the adjustment is zero from time T11 to time T12, so the cursor A1 in FIG. 3 is fixed in the dictated position shown in FIG. 6C. As a result, the cursor A1 in FIG. 3 is positioned within the display area of the YES button A3 or the NO button A5 at time T13, at which time the pressing of the button B1 of the dictating device 10-1 is released. Consequently, the display device 20 determines that YES or NO has been selected by the user.

2-3. Operation

Next, a flow of a process performed by the dictating device 10-1 according to the first embodiment of the present disclosure will be described with reference to FIGS. 7 and 8.

Figure 7:
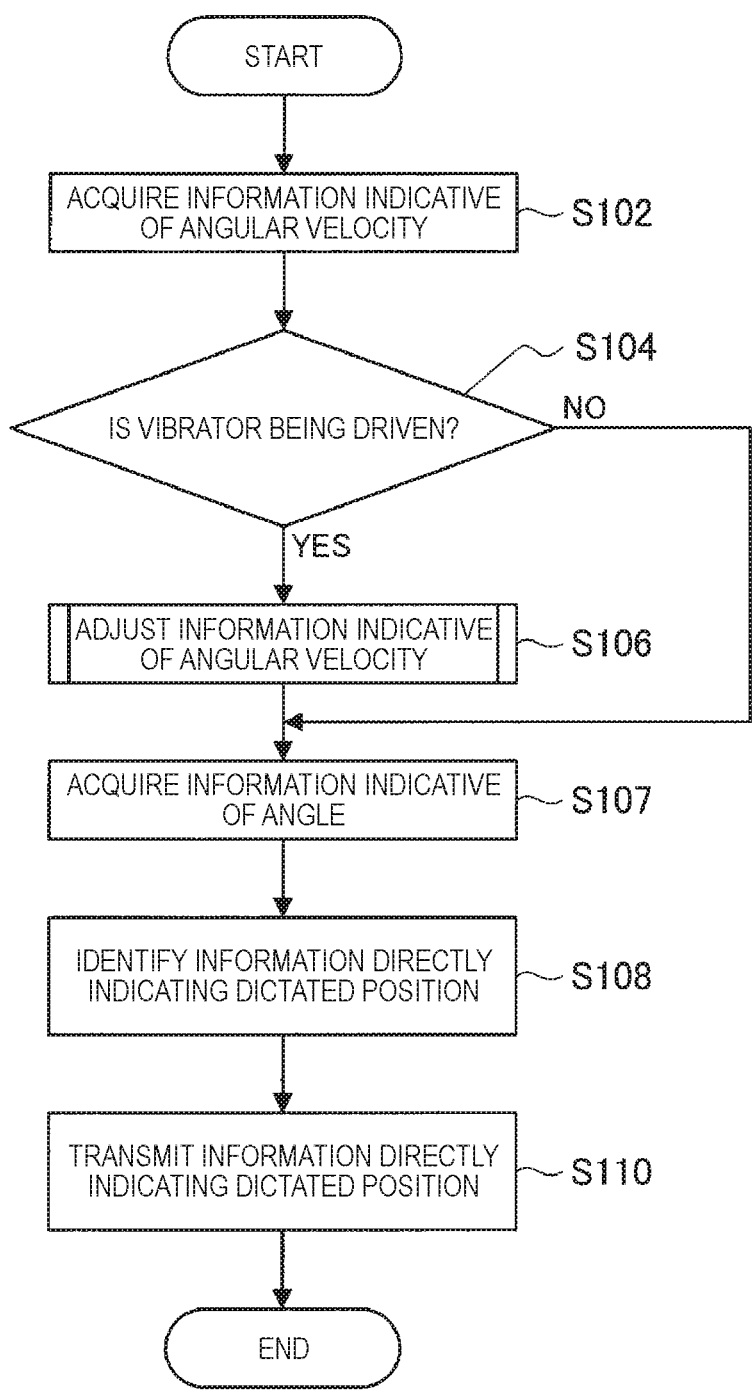
FIG. 7 is a flowchart illustrating a specific example of a flow of a process performed by the dictating device according to the first embodiment of the present disclosure.

FIG. 7 is a flowchart illustrating a specific example of a flow of a process performed by the dictating device 10-1 according to the first embodiment of the present disclosure. As shown in FIG. 7, first, when the detection information acquiring portion 106 acquires information indicative of the angular velocity of the dictating device 10-1 (step S102), the detection information acquiring portion 106 then outputs the acquired information indicative of the angular velocity to the adjusting portion 110. Then, if the adjusting portion 110 determines that the vibrator is being driven (YES in step S104), the adjusting portion 110 performs a detection information adjustment process (step S106). On the other hand, if the adjusting portion 110 does not determine that the vibrator is being driven (NO in step S104), step S106 is skipped.

Next, the adjusting portion 110 acquires information indicative of the angle of the dictating device 10-1 (step S107) by performing an integration operation on the adjusted information indicative of the angular velocity in the pitch direction D1. Then, the adjusting portion 110 identifies the information that directly indicates the dictated position on the screen on the basis of the acquired information indicative of the angle of the dictating device 10-1 (step S108), and outputs the identified information that directly indicates the dictated position to the communication portion 108. The communication portion 108 then transmits the information that directly indicates the dictated position to the display device 20 (step S110). Thereafter, the process described above is repeated.

Figure 8:
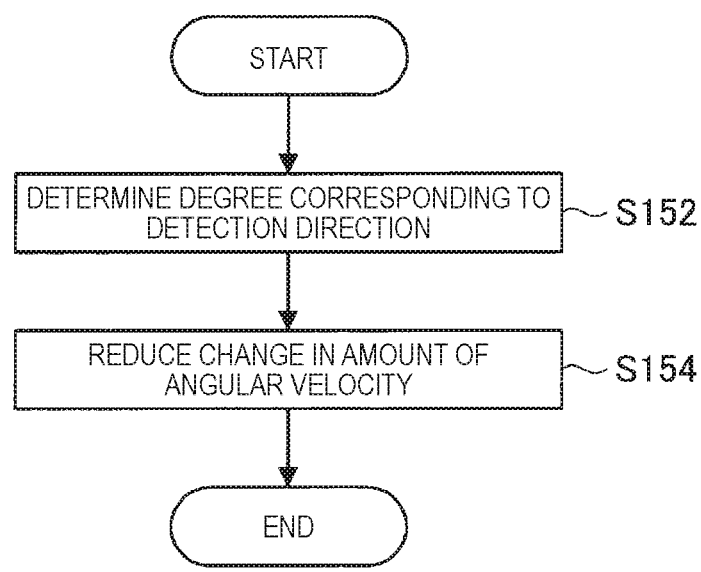
FIG. 8 is a flowchart illustrating a specific example of a flow of a detection information adjusting process performed by the dictating device according to the first embodiment of the present disclosure.

FIG. 8 is a flowchart illustrating a specific example of the flow of the detection information adjusting process executed in step S106 in FIG. 7. As shown in FIG. 8, first, the adjusting portion 110 determines the degree of adjustment in accordance with the detection direction of the movement detection by the detection information acquiring portion 106 (step S152). Next, the adjusting portion 110 reduces the amount of change in the information indicative of the angular velocity while the vibrator is being driven, by the degree determined in step S152 (step S154). Then the detection information adjusting process ends.

According to the embodiment described above, the adjusting portion 110 identifies information for determining the dictated position dictated by the dictating device 10-1, on the basis of the detection information input from the detection information acquiring portion 106 and the driving information input from the driving information acquiring portion 128. As a result, a function in accordance with the intention of the user is able to be realized without being affected by the driving of the driving device.

Also, according to the embodiment described above, the adjusting portion 110 identifies information for determining the dictated position, by adjusting the detection information while the driving device is being driven. As a result, the realization of a function in accordance with the intention of the user is able to be inhibited from being adversely affected by the driving of the driving device.

Also, according to an embodiment, the adjusting portion 110 identifies dictated position information by reducing the amount of change in the detection information while the driving device is being driven. Therefore, an unexpected fluctuation in the dictated position due to the driving of the driving device in response to a command input by the user is able to be reduced.

Also, according to an embodiment, the adjusting portion 110 identifies information for determining the dictated position, by adjusting the detection information by a degree corresponding to the detection direction of the movement detection of the dictating device 10-1 by the detection information acquiring portion 106. Therefore, an unexpected fluctuation in the dictated position in a direction in which the dictated position tends to fluctuate due to the driving of the driving device is able to be more effectively inhibited.

2-4. Application Example

Above, an example in which the dictating device 10 identifies information for determining a dictated position dictated by the dictating device 10 is described. The present disclosure is not limited to this example. The function of identifying information for determining a dictated position dictated by the dictating device 10 may also be realized by an information processing apparatus that communicates with each of the dictating device 10 and the display device 20. Hereinafter, such an information processing apparatus will be described with reference to FIG. 9.

Figure 9:
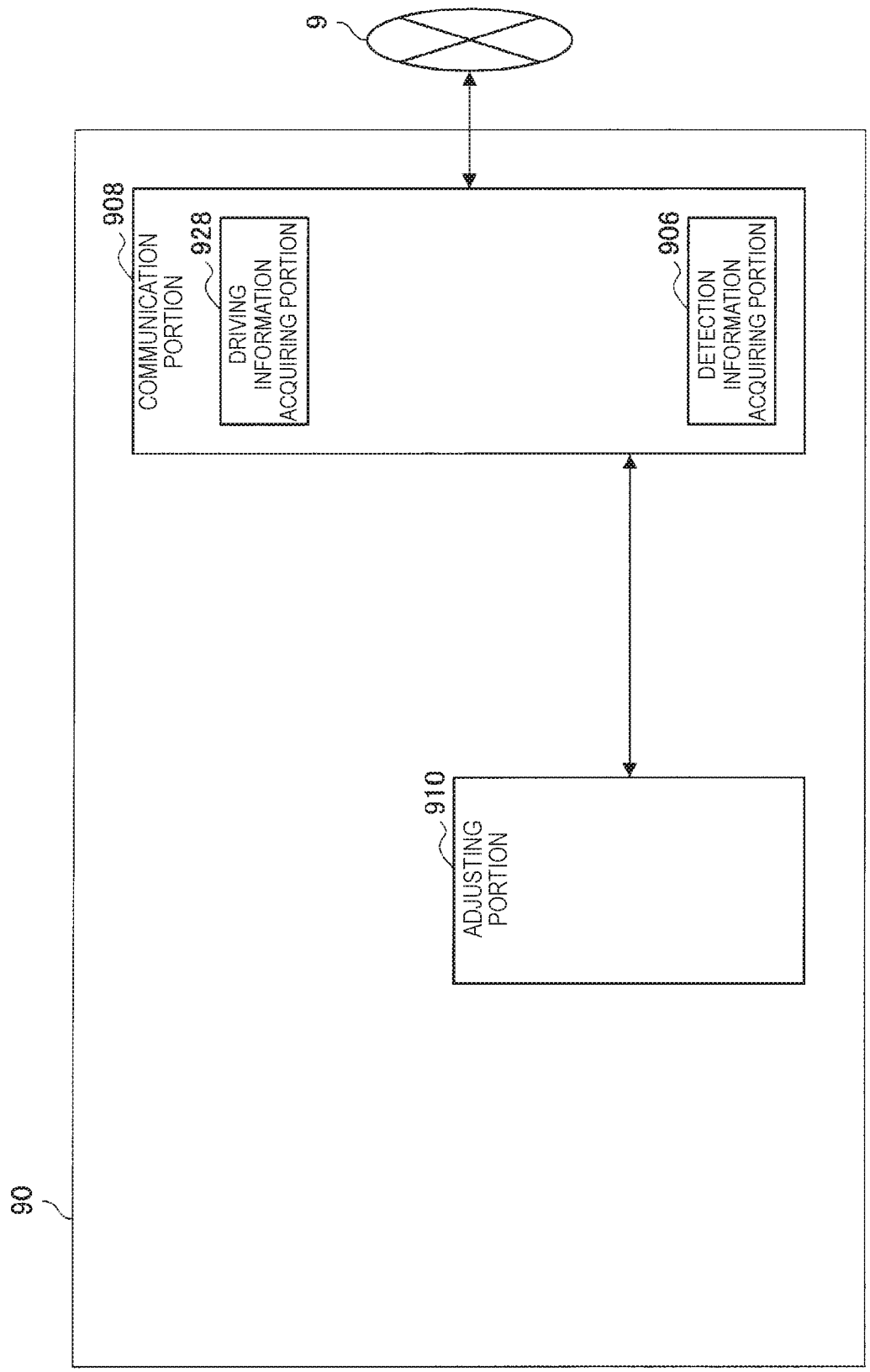
FIG. 9 is an explanatory view illustrating a specific example of a configuration of a logical function of an information processing apparatus according to an application example.

FIG. 9 is an explanatory view illustrating a specific example of a configuration of a logical function of an information processing apparatus 90 according to an application example. As shown in FIG. 9, the information processing apparatus 90 includes a communication portion 908 and an adjusting portion 910.

The communication portion 908 includes a detection information acquiring portion 906 and a driving information acquiring portion 928, and communicates with a device outside of the information processing apparatus 90. More specifically, the communication portion 908 communicates with the dictating device 10 and the display device 20 via a wired or wireless information network 9. For example, the communication portion 908 transmits information for determining a dictated position input from the adjusting portion 910, to the display device 20.

The detection information acquiring portion 906 acquires the detection information transmitted from the dictating device 10, and outputs the acquired detection information to the adjusting portion 910. The driving information acquiring portion 928 acquires the driving information transmitted from the display device 20, and outputs the acquired driving information to the adjusting portion 910. The communication portion 908 may also communicate directly with a device outside of the information processing apparatus 90 without going through the information network 9.

The adjusting portion 910 identifies information for determining a dictated position dictated by the dictating device 10, on the basis of the detection information and the driving information input from the communication portion 908, and outputs the identified information for determining the dictated position to the communication portion 908.

3. Dictating Device According to a Second Embodiment

In the preceding section, a dictating device 10-1 according to the first embodiment of the present disclosure was described. Next, a dictating device 10-2 according to a second embodiment of the present disclosure that enables a dictated position in accordance with the intention of the user to be identified will be described. In this section, an example will be described in which the display device 20 drives the vibrator for a certain period of time when the cursor A1 enters the display area of the YES button A3 or the NO button A5 shown in FIG. 3 from outside the display area. Also in this section, an example will be described in which the display device 20 determines that the user has selected YES or NO when the button B1 of the dictating device 10 is pressed while the cursor A1 is positioned in the display area of the YES button A3 or the NO button A5.

3-1. Second Comparative Example

In order to clarify the technical significance of the dictating device 10-2 according to the second embodiment of the present disclosure, a second comparative example will first be described, after which the dictating device 10-2 according to the second embodiment of the present disclosure will be described in detail.

FIGS. 10A, 10B, 10C and 11A, 11B and 11C are explanatory views illustrating first and second examples, respectively, of effects that the driving of the vibrator has on the dictated position. In FIGS. A, 10B, 10C and 11A, 11B and 11C, the angular velocity in the pitch direction D1 is given as an example of a component of the angular velocity, and the Y coordinate of the dictated position is given as an example of a component of the dictated position.

Figure 10:
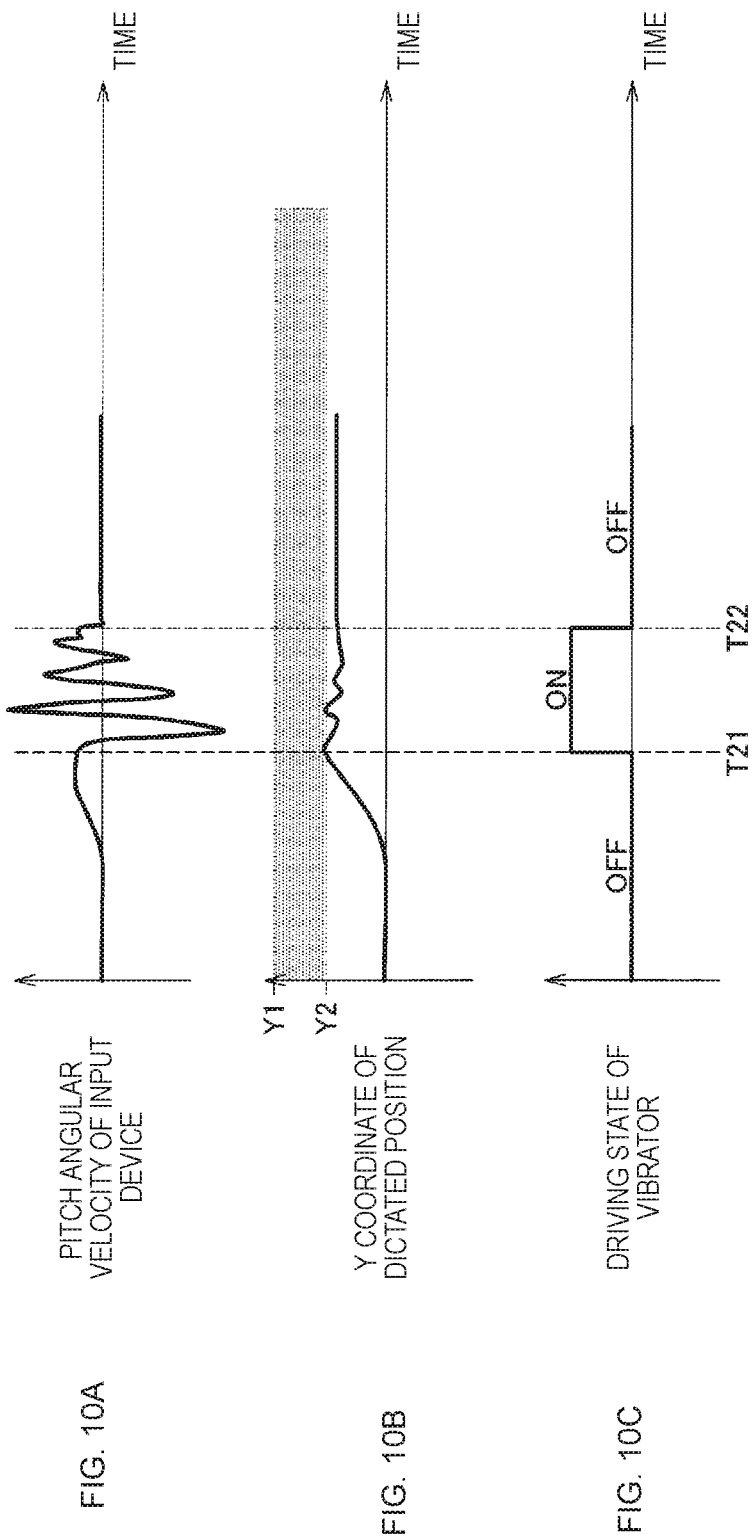
FIGS. 10A, 10B and 10C are explanatory views illustrating an effect that vibration of a vibrator has on a dictated position, in a second comparative example.
Figure 11:
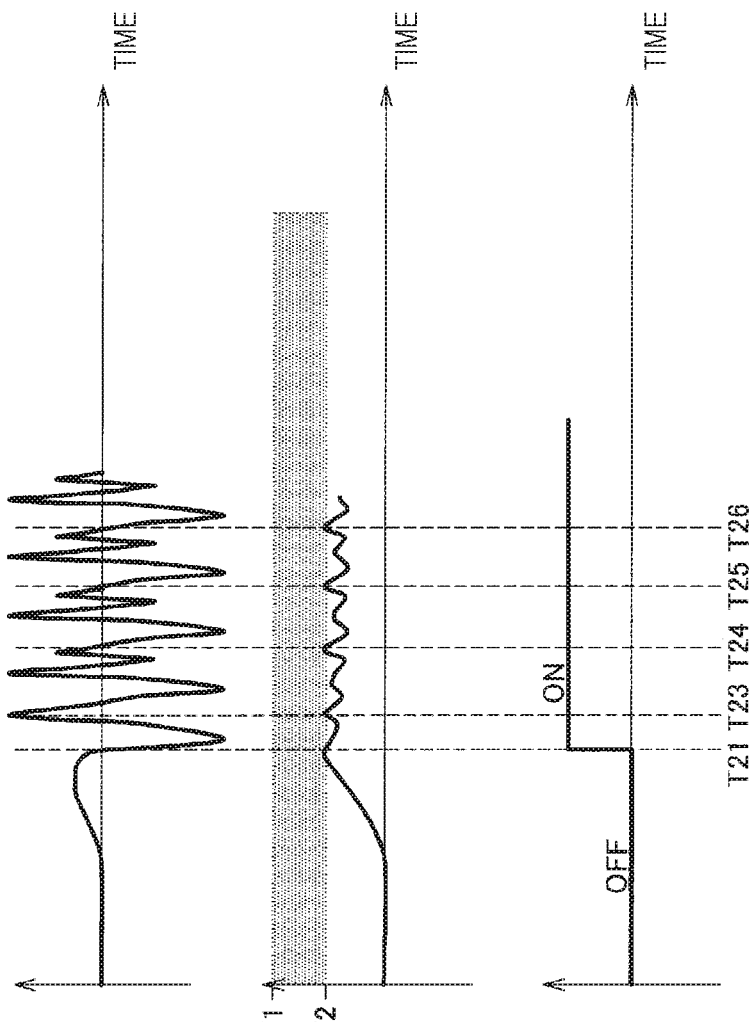
FIGS. 11A, 11B and 11C are explanatory views illustrating an effect that vibration of a vibrator has on a dictated position, in a second comparative example.

FIGS. 10A and 11A shows a change over time in the angular velocity in the pitch direction D1 of the dictating device 10 in the information indicative of the angular velocity in the pitch direction D1 acquired by the dictating device 10. FIGS. 10B and 11B shows a change over time in the Y coordinate of the dictated position determined by the display device 20. Also, in FIGS. 10B and 11B, Y1 and Y2 are Y coordinates of the upper end and the lower end of the display area of the YES button A3 or the NO button A5 in FIG. 3, respectively. FIGS. 10C and 11C shows a change over time in the driving state of the vibrator.

First, according to a first example, when the cursor A1 enters the display area of the YES button A3 or the NO button A5 from outside the display area at time T21, as shown in FIG. 10B, the vibrator is driven for a certain period of time (from time T21 to time T22), as shown in FIG. 10C. Also, the dictating device 10 is made to vibrate by the vibrator, and the change over time in the angular velocity in the pitch direction D1 of the dictating device 10 exhibits a vibration waveform, as shown in A FIG. 10A.

Then, the cursor A1 in FIG. 3 moves in a direction away from the display area of the YES button A3 or the NO button A5, in accordance with the change over time in the dictated position shown in FIG. 10B. As a result, the cursor A1 is positioned outside the display area of the YES button A3 or the NO button A5 at time T22, as shown in FIG. 10B. Consequently, the user is unable to select YES or NO at time T22.

Next, according to a second example, when the cursor A1 enters the display area of the YES button A3 or the NO button A5 from outside the display area at time T21, as shown in FIG. 11B, the vibrator starts to be driven, as shown in FIG. 11C. Also, the dictating device 10 is made to vibrate by the vibrator, and the change over time in the angular velocity in the pitch direction D1 of the dictating device 10 exhibits a vibration waveform, as shown in FIG. 11A.

Then, the cursor A1 in FIG. 3 moves in a direction away from the display area of the YES button A3 or the NO button A5, in accordance with the change over time in the dictated position shown in FIG. 11B. Next, when the cursor A1 enters the display area of the YES button A3 or the NO button A5 from outside the display area again at time T23, the display device 20 transmits the driving information again, and the vibrator continues to be driven. As a result, the cursor A1 again moves in a direction away from the display area of the YES button A3 or the NO button A5. Thereafter, at time T24 to T26, the cursor A1 similarly repeatedly enters the display area of the YES button A3 or the NO button A5. Consequently, the user is unable to select YES or NO.

As described above, in the second comparative example, an unexpected fluctuation in the dictated position occurs due to the driving of the vibrator that accompanies the movement of the cursor on the screen. Consequently, movement of the cursor that is intended by the user on the screen will not be realized. Therefore, in the second comparative example, it is difficult to realize a function in accordance with the intention of the user.

3-2. Functional Configuration

Next, a configuration of a logical function of the dictating device 10-2 according to the second embodiment of the present disclosure will be described with reference to FIGS. 12 and 13A, 13B, 13C, 13D and 13E.

Figure 12:
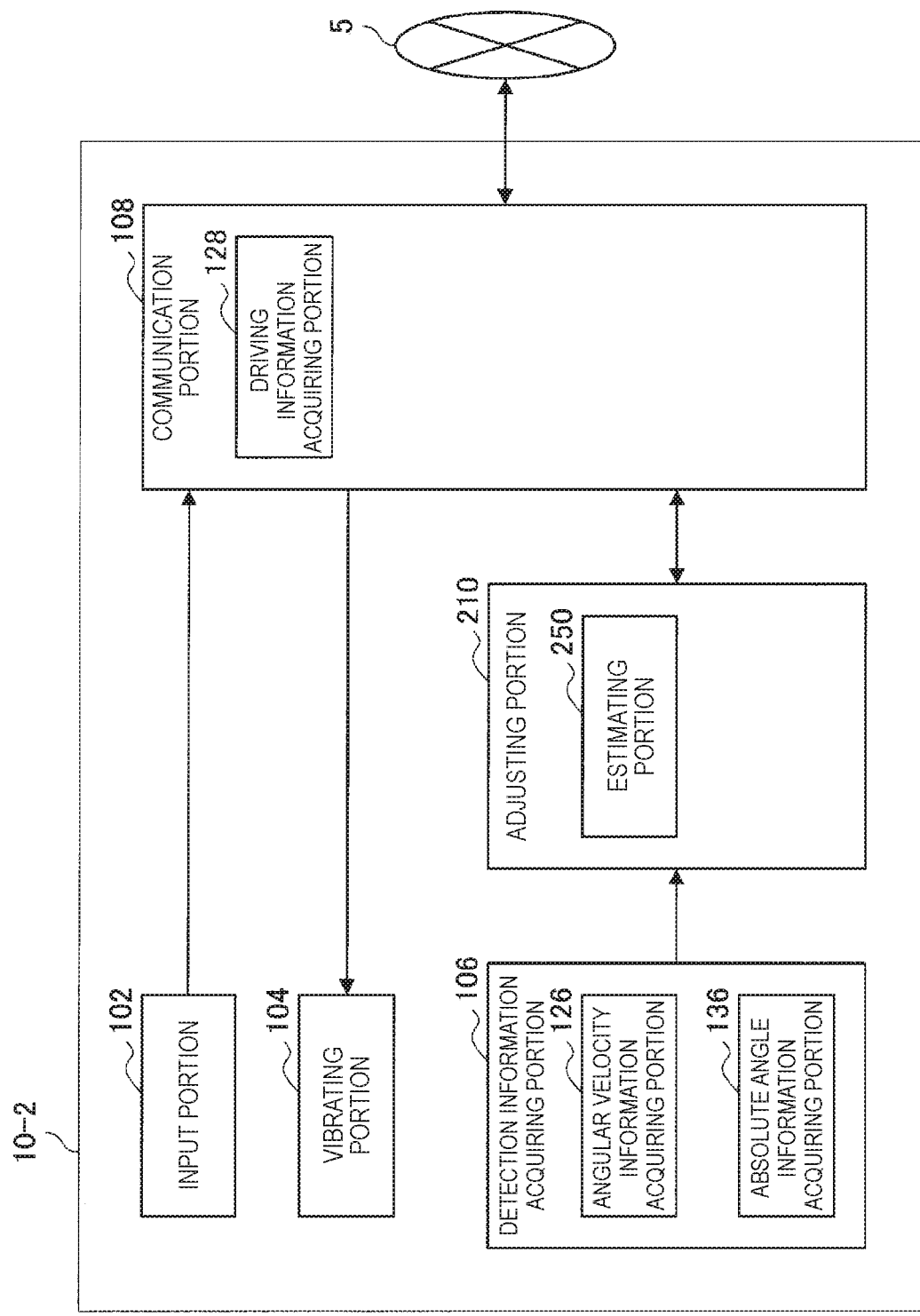
FIG. 12 is explanatory view illustrating a specific example of a configuration of a logical function of a dictating device according to a second embodiment of the present disclosure.

FIG. 12 is an explanatory view illustrating a specific example of a configuration of a logical function of the dictating device 10-2 according to the second embodiment of the present disclosure. In the dictating device 10-2 according to the second embodiment of the present disclosure, an adjusting portion 210 includes an estimating portion 250, as shown in FIG. 12.

In the second embodiment of the present disclosure, driving information includes movement controlling information for controlling movement imparted to the dictating device 10-2 by the vibrator, and the estimating portion 250 estimates, in accordance with the movement controlling information, a component due to the movement imparted by the vibrator in the detection information acquired by the detection information acquiring portion 106. Also, the adjusting portion 210 identifies information for determining the dictated position by subtracting the estimated component due to the movement imparted by the vibrator in the detection information from the detection information acquired by the detection information acquiring portion 106. The adjusting portion 210 also outputs the identified information for determining the dictated position to the communication portion 108.

The movement controlling information includes, for example, information indicating a value of voltage applied to the vibrator, and the estimating portion 250 estimates, in accordance with the information indicating the value of the voltage applied to the vibrator, a component due to the movement imparted by the vibrator in the information indicative of the angular velocity of the dictating device 10-2 acquired by the detection information acquiring portion 106. More specifically, the estimating portion 250 calculates the acceleration of the dictating device 10-2 imparted by the vibrator, by multiplying the value of the voltage applied to the vibrator by a conversion factor. The estimating portion 250 then acquires the velocity of the dictating device 10-2 by performing an integration operation on the calculated acceleration of the dictating device 10-2. Then, the estimating portion 250 estimates the component due to the movement imparted by the vibrator in the information indicative of the angular velocity of the dictating device 10-2, by dividing the distance between the center of gravity of the dictating device 10-2 and the vibrator by the acquired velocity of the dictating device 10-2.

Figure 13:
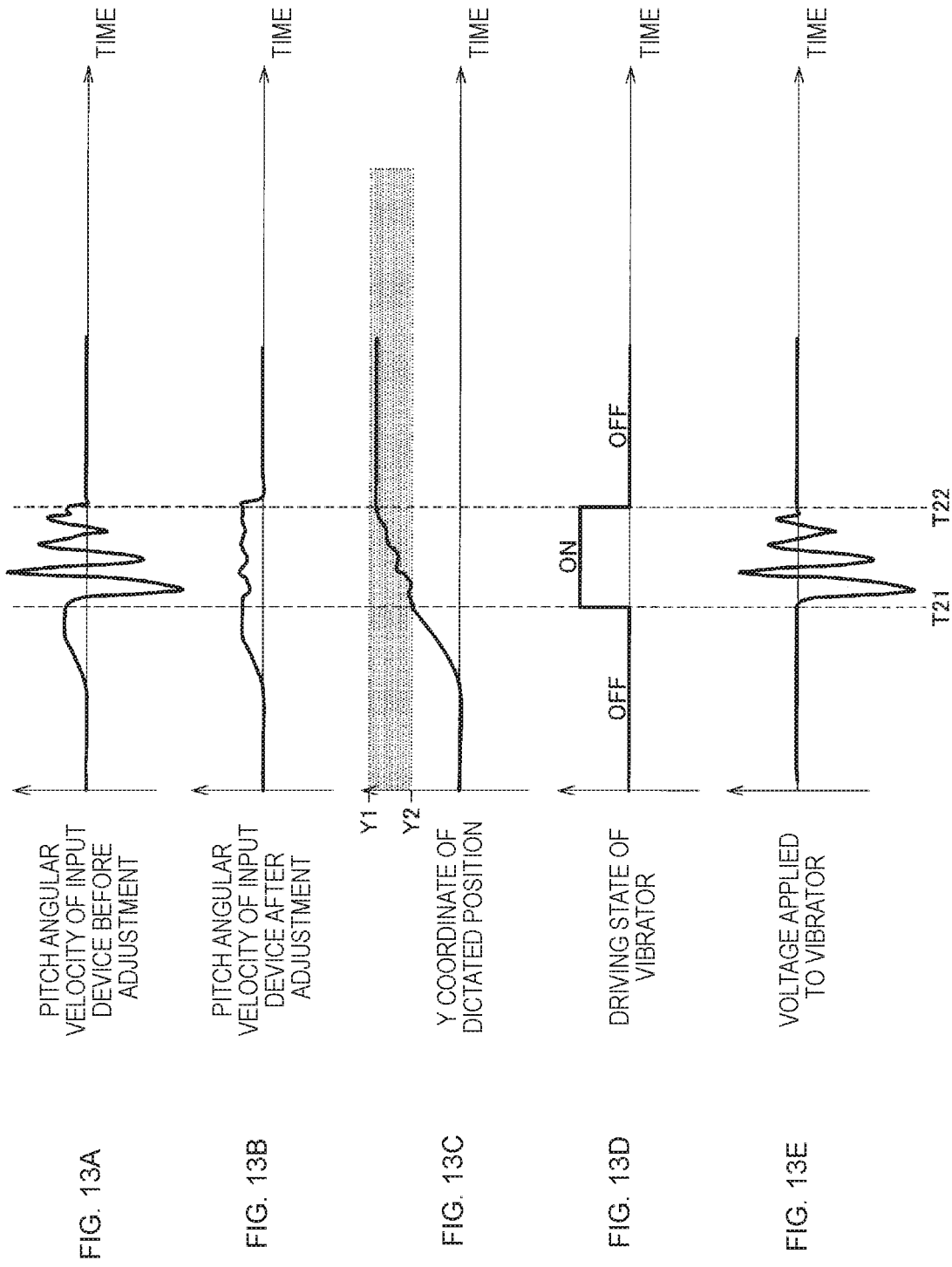
FIGS. 13A, 13B, 13C, 13D, and 13E are an explanatory views illustrating a specific example of a detection information adjustment process performed by the dictating device according to the second embodiment of the present disclosure.

FIGS. 13A, 13B, 13C, 13D and 13E are explanatory views illustrating a specific example of a detection information adjustment process performed by the adjusting portion 210. In FIGS. 13A, 13B, 13C, 13D and 13E, the angular velocity in the pitch direction D1 is given as an example of a component of the angular velocity, and the Y coordinate of the dictated position is given as an example of a component of the dictated position. FIG. 13A shows a change over time in the angular velocity in the pitch direction D1 of the dictating device 10-2 in the information indicative of the angular velocity in the pitch direction D1 acquired by the detection information acquiring portion 106. FIG. 13B shows a change over time in the angular velocity in the pitch direction D1 of the dictating device 10-2 in the information indicative of the angular velocity in the pitch direction D1 adjusted by the adjusting portion 210. FIG. 13C shows a change over time in the Y coordinate of the dictated position in the information that directly indicates the dictated position on the screen identified by the adjusting portion 210. Also, in FIG. 13C, Y1 and Y2 are Y coordinates of the upper end and the lower end of the display area of the YES button A3 or the NO button A5 in FIG. 3, respectively. FIG. 13D shows a change over time in the driving state of the vibrator. FIG. 13E shows a change over time in the value of the voltage applied to the vibrator.

When the cursor A1 enters the display area of the YES button A3 or the NO button A5 from outside the display area at time T21, as shown in FIG. 13C, the vibrator is driven, as shown in FIG. 13D. The dictating device 10-2 is then vibrated by the vibrator, and the change over time in the angular velocity in the pitch direction D1 of the dictating device 10-2 in the information indicative of the angular velocity in the pitch direction D1 of the dictating device 10-2 acquired by the detection information acquiring portion 106 exhibits a vibration waveform, as shown in A of FIG. 13A.

Also, according to the second embodiment, the adjusting portion 210 estimates, in accordance with the information indicating the value of the voltage applied to the vibrator shown in FIG. 13E, a component due to the movement imparted by the vibrator in the information indicative of the angular velocity in the pitch direction D1. Also, the adjusting portion 210 identifies information that directly indicates the dictated position on the screen by subtracting the estimated component due to the movement imparted by the vibrator in the information indicative of the angular velocity in the pitch direction D1 from the information indicative of the angular velocity in the pitch direction D1 acquired by the detection information acquiring portion 106. Consequently, the component due to the movement imparted by the vibrator, in the angular velocity in the pitch direction D1 in the adjusted information indicative of the angular velocity in the pitch direction D1, is reduced from time T21 to time T22, as shown in FIG. 13B. Then, after the cursor A1 enters the display area of the YES button A3 or the NO button A5, the cursor A1 moves in the same direction as the direction in which the cursor A1 entered the display area, between time T21 and time T22, as shown in FIG. 13C. The vibrator then stops vibrating at time T22.

3-3. Operation

Next, a flow of a detection information adjusting process performed by the dictating device 10-2 according to the second embodiment of the present disclosure will be described with reference to FIG. 14. Below, an example in which the adjusting portion 210 identifies the dictated position information itself on the basis of angular velocity information and driving information will be described.

Figure 14:
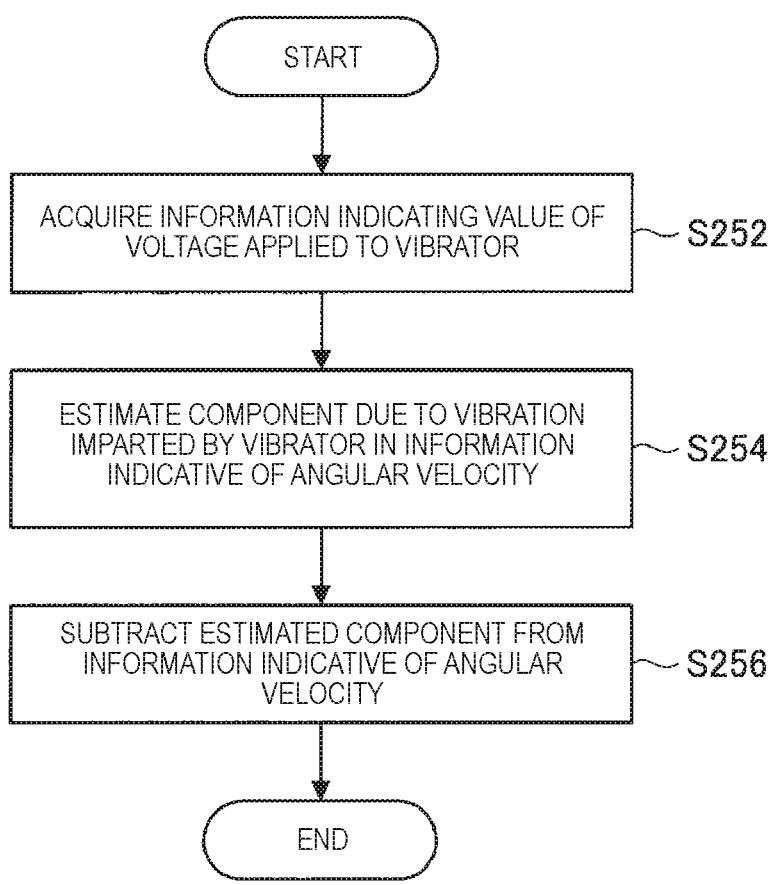
FIG. 14 is a flowchart illustrating a specific example of a flow of a detection information adjusting process performed by the dictating device according to the second embodiment of the present disclosure.

FIG. 14 is a flowchart illustrating a specific example of a flow of a detection information adjusting process performed by the dictating device 10-2 according to the second embodiment of the present disclosure. As shown in FIG. 14, first the adjusting portion 210 acquires information indicating the value of the voltage applied to the vibrator from the driving information acquiring portion 128 (step S252). Next, the estimating portion 250 estimates, in accordance with the information indicating the value of the voltage applied to the vibrator, a component due to the movement imparted by the vibrator in the information indicative of the angular velocity of the dictating device 10-2 acquired by the detection information acquiring portion 106 (step S254). Next, the adjusting portion 210 subtracts the estimated component from the information indicative of the angular velocity acquired by the detection information acquiring portion 106 (step S256). Then the detection information adjusting process ends.

According to the embodiment described above, the adjusting portion 210 identifies information for determining the dictated position by estimating the component due to the movement imparted by the driving device in the detection information in accordance with movement controlling information, and subtracting the estimated component due to the movement imparted by the driving device in the detection information from the detection information. As a result, a dictated position in accordance with the intention of the user is able to be identified.

4. Dictating Device According to a Third Embodiment

In the preceding section, the dictating device 10-2 according to the second embodiment of the present disclosure was described. Next, a dictating device 10-3 according to a third embodiment of the present disclosure that enables a dictated position in accordance with the intention of the user to be identified will be described.

4-1. Functional Configuration

First, a configuration of a logical function of the dictating device 10-3 according to the third embodiment of the present disclosure will be described with reference to FIGS. 15 to 17.

Figure 15:
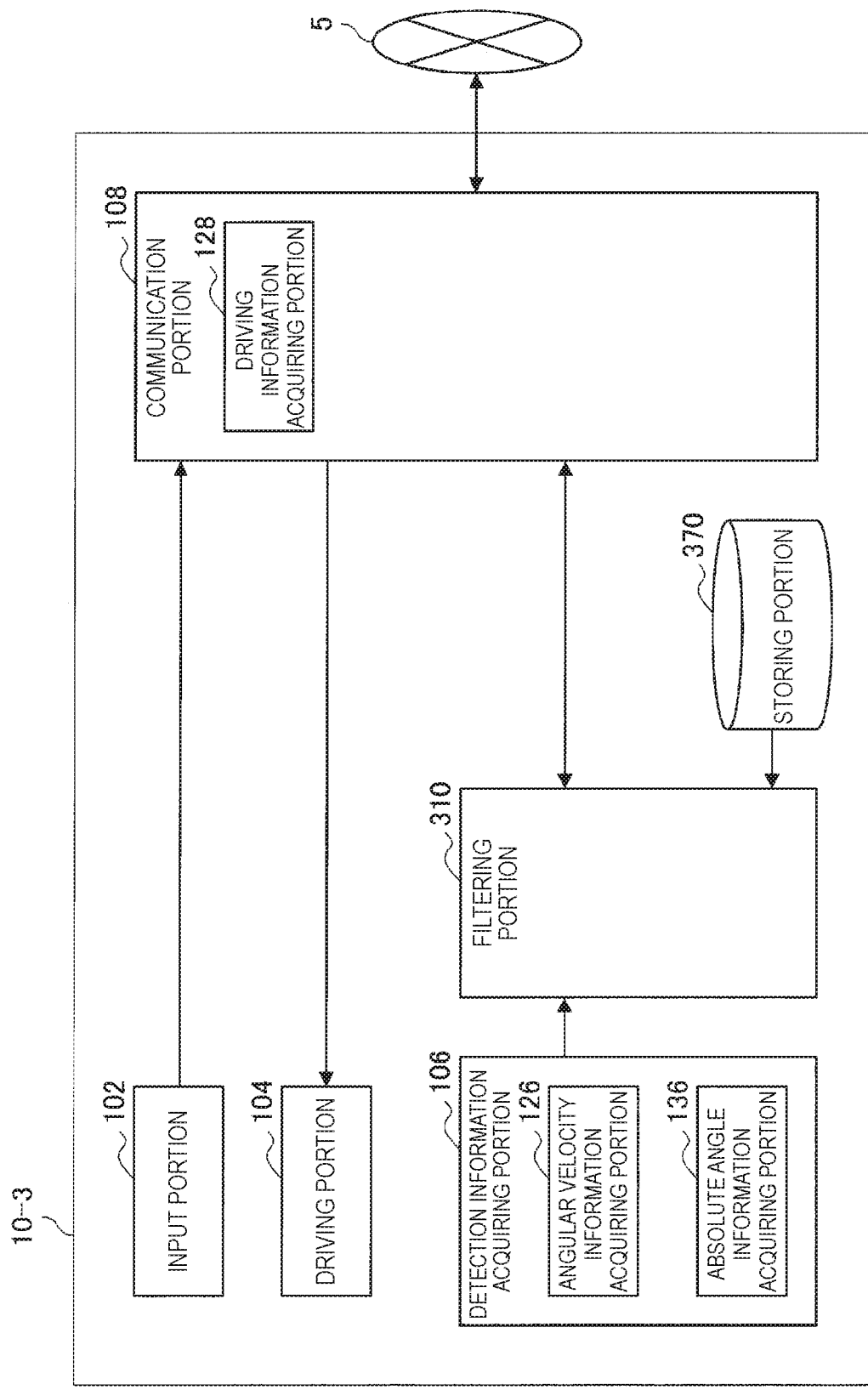
FIG. 15 is an explanatory view illustrating a specific example of a configuration of a logical function of a dictating device according to a third embodiment of the present disclosure.

FIG. 15 is an explanatory view illustrating a specific example of a configuration of a logical function of the dictating device 10-3 according to the third embodiment of the present disclosure. The dictating device 10-3 according to the third embodiment of the present disclosure includes a filtering portion 310 and a storing portion 370, as shown in FIG. 15.

The filtering portion 310 functions as an identifying portion that identifies information for determining a dictated position by filtering detection information while the vibrator is being driven, which is obtained by the detection information acquiring portion 106. More specifically, filtering portion 310 identifies information for determining the dictated position by filtering the detection information while the vibrator is being driven, using a filter that attenuates a frequency component of the vibration imparted to the dictating device 10-3 by the vibrator. The filtering portion 310 also outputs the identified information for determining the dictated position to the communication portion 108.

Figure 16:
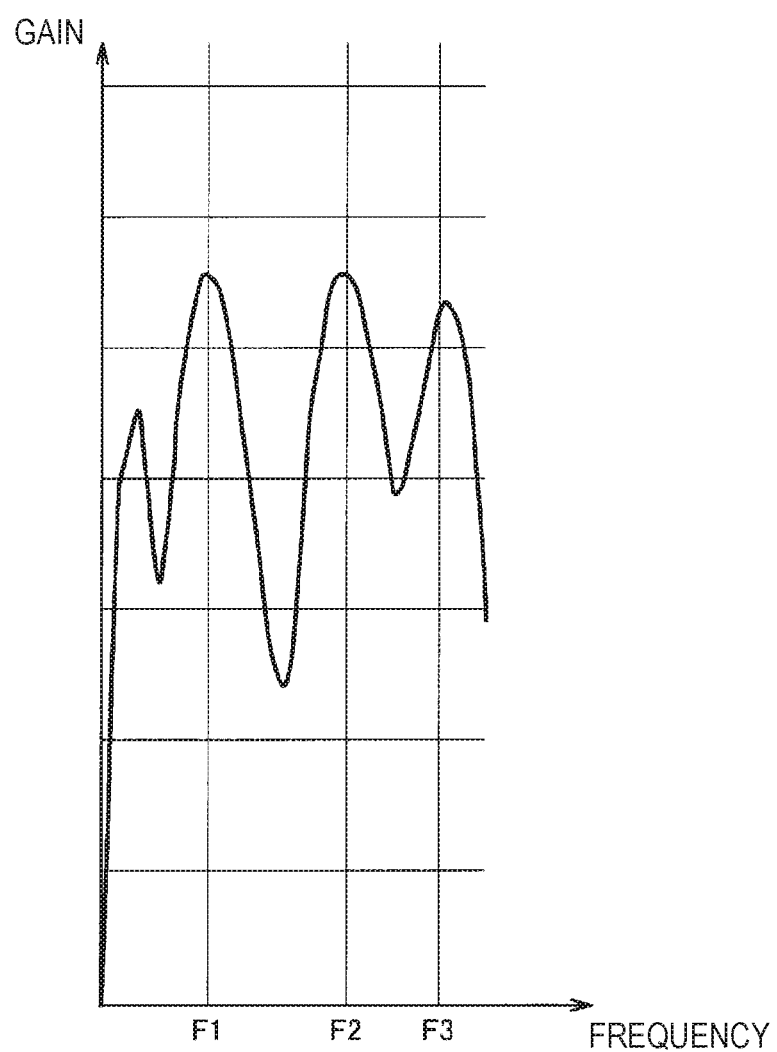
FIG. 16 is an explanatory view illustrating a specific example of a frequency characteristic of vibration imparted to the dictating device.
Figure 17:
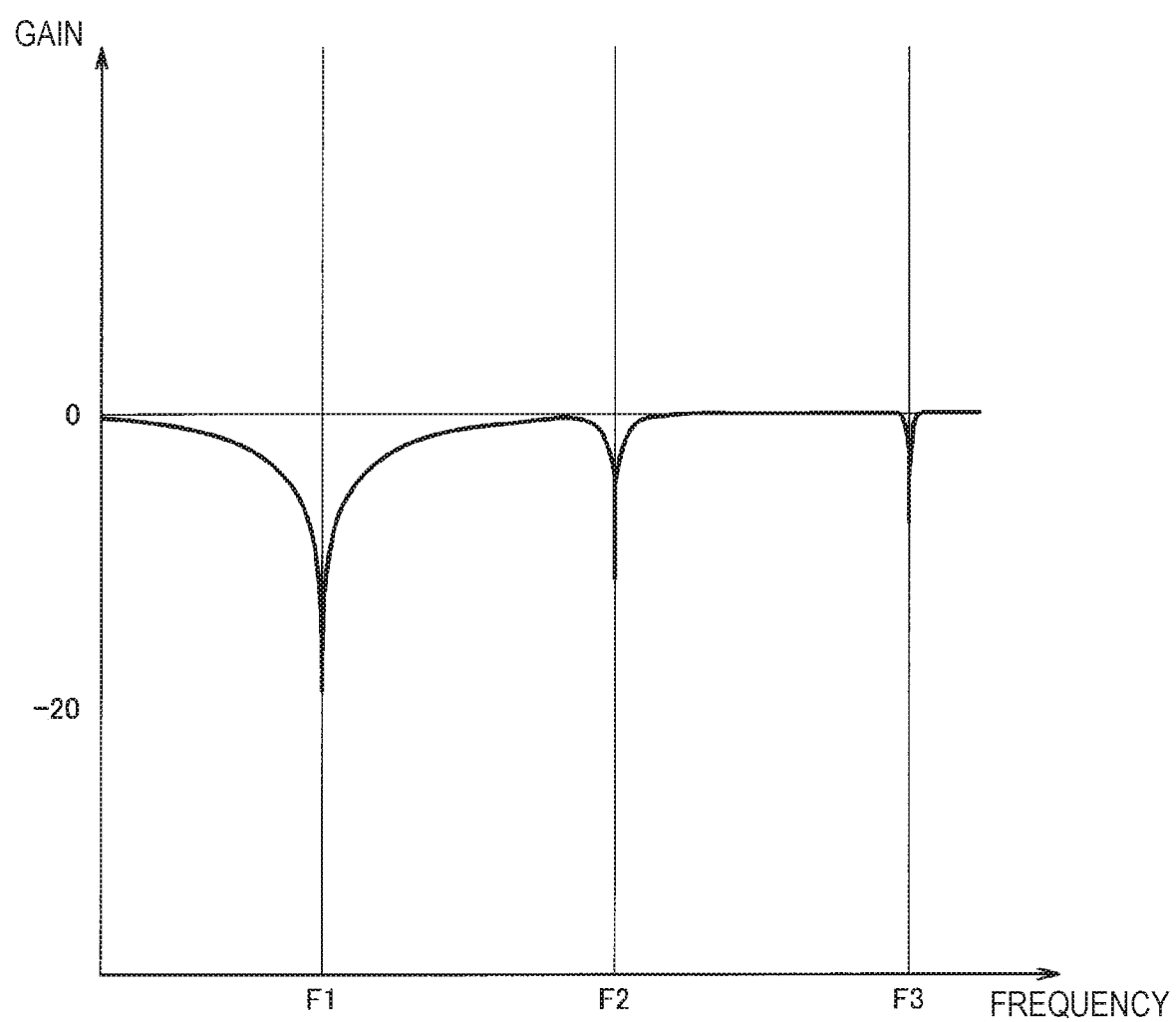
FIG. 17 is an explanatory view illustrating a specific example of a frequency characteristic of a filter used in filtering.

FIG. 16 is an explanatory view of a specific example of a frequency characteristic of the vibration imparted to the dictating device 10-3 by the vibrator. The frequency characteristic shown in FIG. 16 has peaks at frequencies F1, F2, and F3. FIG. 17 is an explanatory view of a specific example of a frequency characteristic of a filter used in the filtering by the filtering portion 310. The frequency characteristic shown in FIG. 17 also has peaks at frequencies F1, F2, and F3, similar to the frequency characteristic shown in FIG. 16. Consequently, the filter having the frequency characteristic shown in FIG. 17 is able to attenuate a frequency component of vibration having the frequency characteristic shown in FIG. 16. For example, the filtering portion 310 filters the detection information using a filter having the frequency characteristic shown in FIG. 17. As a result, the component due to the vibration imparted by the vibrator in the detection information is able to be reduced.

Filter coefficient data that is applied to the filter used for the filtering is stored in the storing portion 370 in advance, and the filtering portion 310 performs the filtering by acquiring the filter coefficient data from the storing portion 370.

Also, the driving information may include vibration controlling information for controlling the vibration imparted to the dictating device 10-3 by the vibrator, for example, and the filtering portion 310 may identify information for determining the dictated position by filtering the detection information using a filter corresponding to the vibration controlling information.

For example, filter coefficient data applied to a potential filter determined beforehand for each piece of the vibration controlling information may be stored in the storing portion 370 in advance, and the filtering portion 310 may identify the information for determining the dictated position by selecting a filter from among the plurality of potential filters in accordance with the vibration controlling information, and filtering the detection information using the selected filter. More specifically, the filtering portion 310 performs the filtering by acquiring the filter coefficient data applied to the selected filter from the storing portion 370.

4-2. Operation

Next, a flow of a detection information adjusting process performed by the dictating device 10-3 according to the third embodiment of the present disclosure will be described with reference to FIG. 18.

Figure 18:
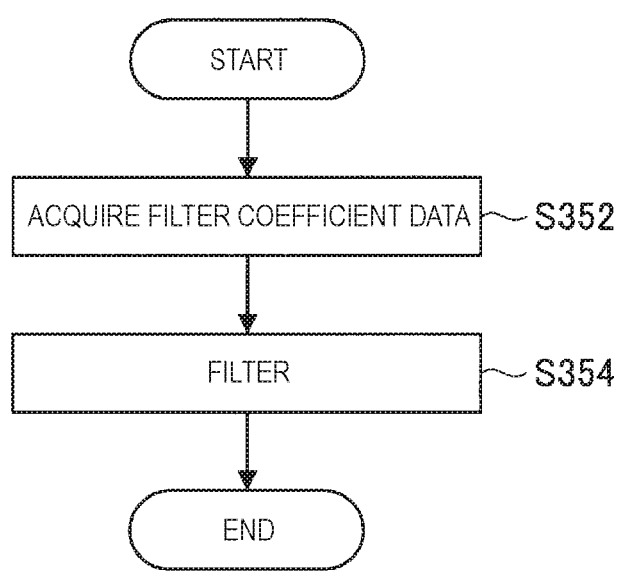
FIG. 18 is a flowchart illustrating a specific example of a flow of a detection information adjusting process performed by the dictating device according to the third embodiment of the present disclosure.

FIG. 18 is a flowchart illustrating a specific example of a flow of a detection information adjusting process performed by the dictating device 10-3 according to the third embodiment of the present disclosure. As shown in FIG. 18, first, the filtering portion 310 acquires the filter coefficient data from the storing portion 370 (step S352). Next, the filtering portion 310 filters the information indicative of the angular velocity of the dictating device 10-3 using the filter to which the acquired filter coefficient data is applied (step S354). Then the detection information adjusting process ends.

According to the embodiment described above, the filtering portion 310 identifies the information for determining the dictated position by performing filtering using a filter that attenuates a frequency component of the vibration imparted to the dictating device 10-3 by the driving device. Accordingly, a dictated position in accordance with the intention of the user is able to be identified by attenuating the component due to the vibration imparted by the driving device in the detection information.

Also, according to an embodiment, the filtering portion 310 identifies the information for determining the dictated position by filtering the detection information using a filter corresponding to the vibration controlling information. As a result, a dictated position in accordance with the intention of the user is able to be identified even if the frequency characteristic of the vibration imparted by the driving device is not fixed.

Also, according to an embodiment, the filtering portion 310 identifies the information for determining the dictated position by selecting a filter from among a plurality of potential filters determined beforehand in accordance with the vibration controlling information, and filtering the detection information using the selected filter. As a result, filtering can be performed quickly when the driving device starts to vibrate. Therefore, information for determining the dictated position can be identified with only a small delay.

4-3. Modified Example

In the preceding section, an example in which filtering is performed using filter coefficient data stored in advance is described. Below, a modified example in which a dictated position in accordance with the intention of the user is able to be identified even when a potential filter is unable to be determined beforehand will be described.

Figure 19:
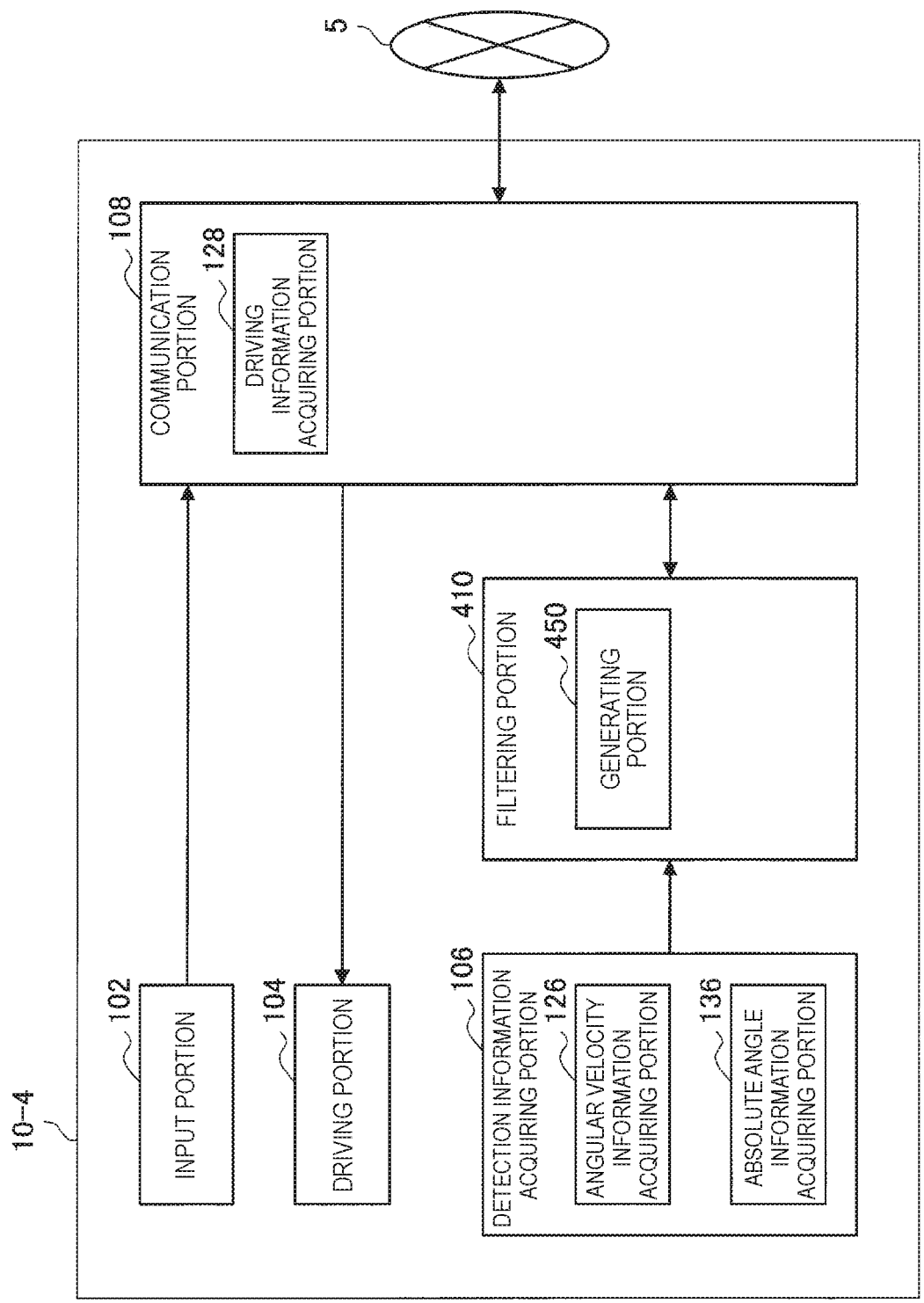
FIG. 19 is an explanatory view illustrating a specific example of a configuration of a logical function of a display device according to a modified example of the present disclosure.

FIG. 19 is an explanatory view illustrating a specific example of a configuration of a logical function of a dictating device 10-4 according to a modified example of the present disclosure. In the dictating device 10-4 according to the modified embodiment, a filtering portion 410 includes a generating portion 450, as shown in FIG. 19.

The filtering portion 410 may identify information for determining a dictated position by generating a filter in accordance with vibration controlling information, and filtering the detection information using the generated filter. For example, the filtering portion 410 generates a filter that attenuates a frequency component of vibration imparted to the dictating device 10-4 by the vibrator, by fast Fourier transforming a signal for controlling a vibration waveform of the vibrator input from the driving information acquiring portion 128.

As described above, according to the modified example, the filtering portion 410 identifies information for determining a dictated position by generating a filter in accordance with the vibration controlling information, and filtering the detection information using the generated filter. As a result, a dictated position in accordance with the intention of the user is able to be identified even when a potential filter is unable to be determined beforehand. Also, memory is able to be saved because filter coefficient data does not have to be stored.

5. Hardware Configuration

Heretofore, embodiments of the present disclosure are described. The processing in the dictating device 10 described above is realized through the cooperation of software, and hardware of the dictating device 10 described below.

Figure 20:
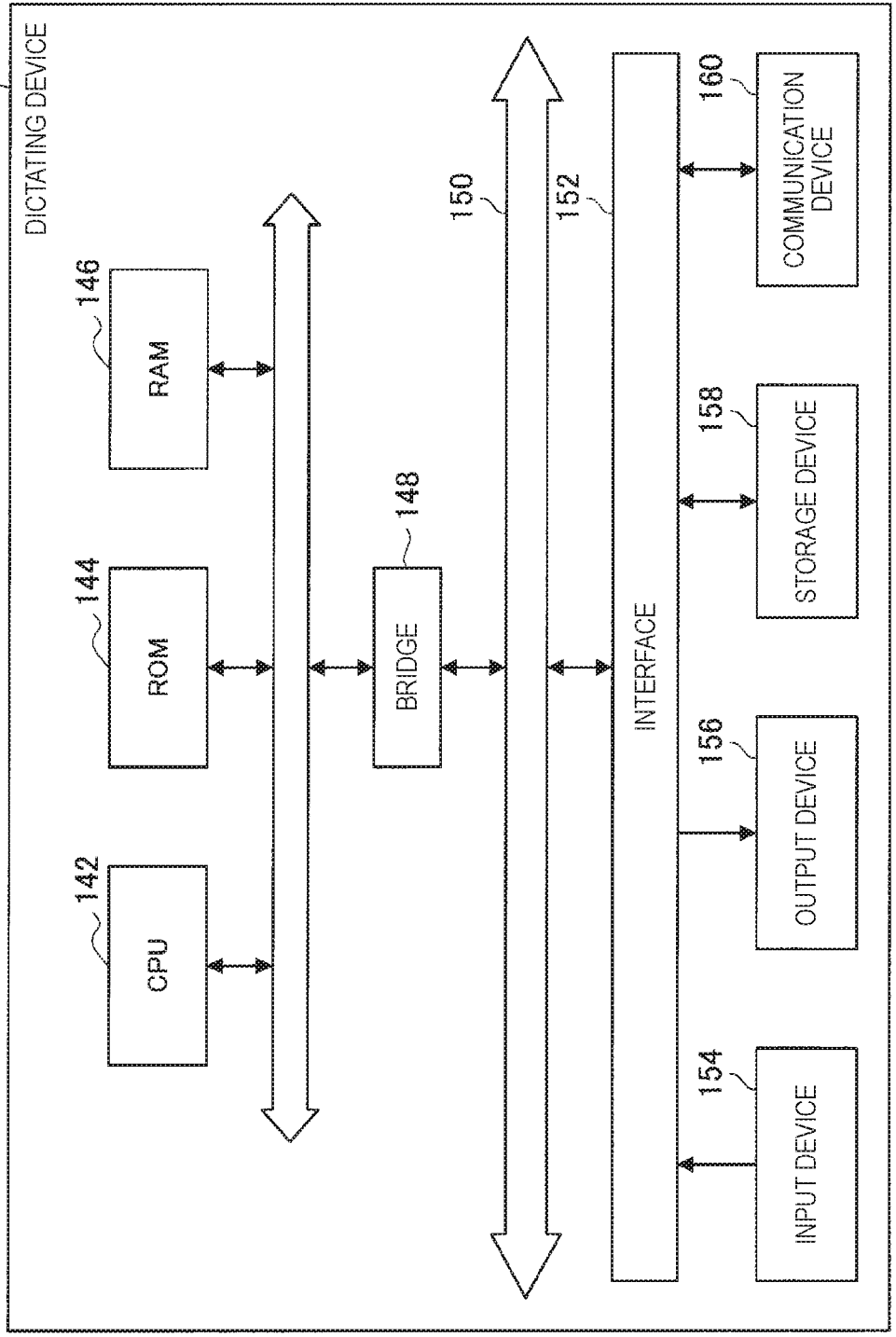
FIG. 20 is an explanatory view illustrating a specific example of a hardware configuration of a dictating device according to the present disclosure.

FIG. 20 is an explanatory view illustrating a hardware configuration of the dictating device 10 according to the present disclosure. As shown in FIG. 20, the dictating device 10 includes a central processing unit (CPU) 142, read only memory (ROM) 144, random access memory (RAM) 146, a bridge 148, a bus 150, an interface 152, an input device 154, an output device 156, a storage device 158, and a communication device 160.

The CPU 142 functions as an operation processing device, and realizes the operation of the adjusting portion 110 of the dictating device 10-1, the adjusting portion 210 of the dictating device 10-2, the filtering portion 310 of the dictating device 10-3 or the filtering portion 410 of the dictating device 10-4, in cooperation with various programs. The CPU 142 may also be a microprocessor. The ROM 144 stores programs or operation parameters or the like used by the CPU 142. The RAM 146 temporarily stores programs used in the execution by the CPU 142 or parameters and the like that change appropriately in that execution. The CPU 142, the ROM 144, and the RAM 146 are connected together by an internal bus formed by a CPU bus or the like.

The input device 154 is one example of the input portion 102 of the dictating device 10, and is inputting means, such as a button, a touch sensor, or a switch, for the user to input data. The input device 154 is configured by an input control circuit or the like that generates an input signal on the basis of input by the user, and outputs the generated input signal to the CPU 142. The user is able to input various kinds of data and direct processing operations with respect to the dictating device 10, by operating the input device 154.

The output device 156 is one example of the vibrating portion 104 of the dictating device 10, and includes, for example, a device such as an eccentric rotating mass (ERM), a linear resonant actuator (LRA), or a voice coil motor (VCM).

The storage device 158 is a device for storing data. The storage device 158 may include a storage medium, a storage device that stores data in a storage medium, a readout device that reads out data from a storage medium, and a deletion device that deletes data stored in a storage medium, and the like. The storage device 158 stores various kinds of data and programs executed by the CPU 142.

The communication device 160 is, for example, a communication interface formed by a communication device for connecting to a network. Also, the communication device 160 may be an infrared communication compliant device, a wireless local area network (LAN) compatible communication device, a long term evolution (LTE) compliant communication device, or a wired communication device that performs communication via a wire.

6. Summary

As described above, according to the embodiments of the present disclosure, information for determining a dictated position dictated by an object is identified on the basis of detection information obtained on the basis of movement detection of the object, and driving information for controlling a driving device that imparts movement to the object. As a result, a function in accordance with the intention of the user is able to be realized without being affected by the driving of the driving device.

Also, according to the embodiments of the present disclosure, the information for determining the dictated position is identified by adjusting the detection information while the driving device is being driven. As a result, the realization of a function in accordance with the intention of the user is able to be inhibited from being adversely affected by the driving of the driving device.

Also, according to an embodiment, the dictated position information is identified by reducing the amount of change in the detection information while the driving device is being driven. Therefore, an unexpected fluctuation in the dictated position due to the driving of the driving device in response to a command input by the user is able to be inhibited.

Also, according to an embodiment, information for determining the dictated position is identified by adjusting the detection information by a degree corresponding to the detection direction of the movement detection of the object. Therefore, an unexpected fluctuation in the dictated position in a direction in which the dictated position tends to fluctuate due to the driving of the driving device is able to be more effectively inhibited.

Also, according to an embodiment, the component due to the movement imparted by the driving device in the detection information is estimated in accordance with the movement controlling information, and the information for determining the dictated position is identified by subtracting the estimated component due to the movement imparted by the driving device in the detection information from the detection information. As a result, a dictated position in accordance with the intention of the user is able to be identified.

Also, according to an embodiment, the information for determining the dictated position is identified by performing filtering using a filter that attenuates a frequency component of the vibration imparted to the object by the driving device. Accordingly, a dictated position in accordance with the intention of the user is able to be identified by reducing the component due to the vibration imparted by the driving device in the detection information.

Also, according to an embodiment, the information for determining the dictated position is identified by filtering the detection information using a filter corresponding to the vibration controlling information. As a result, a dictated position in accordance with the intention of the user is able to be identified even if the frequency characteristic of the vibration imparted by the driving device is not fixed.

Also, according to an embodiment, the information for determining the dictated position is identified by selecting a filter from among a plurality of potential filters determined beforehand in accordance with the vibration controlling information, and filtering the detection information using the selected filter. As a result, filtering can be performed quickly when the driving device starts to vibrate. Therefore, information for determining the dictated position can be identified with only a small delay.

Also, according to an embodiment, the information for determining the dictated position is identified by generating a filter in accordance with the vibration controlling information, and filtering the detection information using the generated filter. As a result, a dictated position in accordance with the intention of the user is able to be identified even when a potential filter is unable to be determined beforehand. Also, memory is able to be saved because filter coefficient data does not have to be stored.

The series of controlling processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution, such programs are written into a random access memory (RAM) and executed by a processor such as a CPU.

Figure 21:
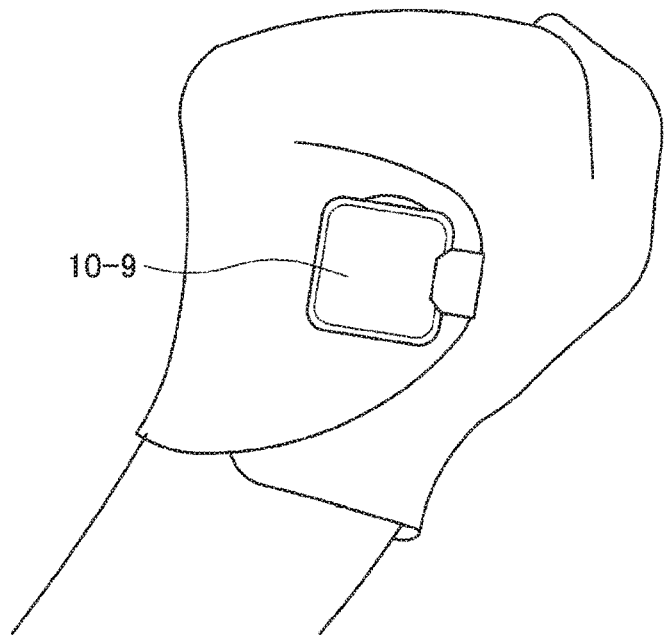
FIG. 21 is an external view illustrating a specific example of a certain vibration emitting device.

Also, the process of identifying information for determining the dictated position described in the present specification may also be applied to a vibration emitting device used for improving a golf swing. FIG. 21 is an external view illustrating a specific example of a vibration emitting device 10-9 worn by a user.

Figure 22:
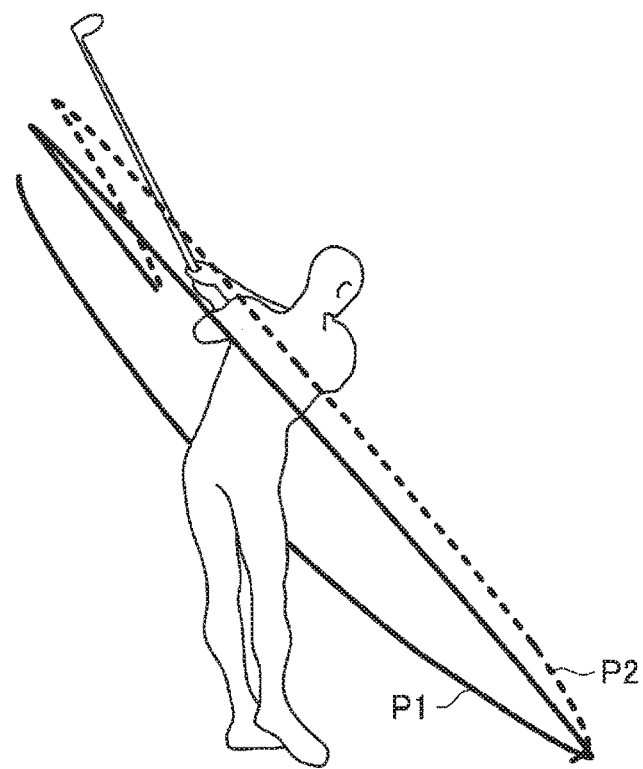
FIG. 22 is an explanatory view illustrating an example of the vibration emitting device shown in FIG. 21 in use.

For example, the vibration emitting device 10-9 identifies information indicative of a club head position on the basis of detection information obtained on the basis of movement detection of the vibration emitting device 10-9. The vibration emitting device 10-9 also compares the identified information indicative of the club head position with information indicative of a reference trajectory, and vibrates on the basis of the comparison results, giving off a vibration to the user. For example, the vibration emitting device 10-9 compares an identified trajectory P1 from the club head position with a reference trajectory P2 in FIG. 22. The vibration emitting device 10-9 then gives off a vibration to the user when the club head position in the trajectory P1 is positioned in a region within a certain distance from the reference trajectory P2, for example.

With the vibration emitting device 10-9, an unexpected fluctuation in the club head position occurs due to the vibration emitted by the vibration emitting device 10-9. Consequently, the position of the club head may deviate from the region within a certain distance from the reference trajectory P2. Therefore, the vibration emitted by the vibration emitting device 10-9 may adversely affect a function in accordance with the intention of the user. Hence, a function in accordance with the intention of the user is able to be realized by identifying information indicative of the club head position on the basis of detection information obtained on the basis of the movement detection of the vibration emitting device 10-9 and driving information for controlling the vibration emitting device 10-9, similar to the process of identifying information for determining the dictated position described in the present specification.

Further, note that it is not necessary for the processes described in this specification with reference to the flowchart to be executed in the order shown in the flowchart. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
an acquiring portion that acquires driving information for controlling a driving device that imparts movement to an object; and
an identifying portion that identifies information for determining a dictated position dictated by the object, on the basis of detection information obtained on the basis of movement detection of the object and the driving information acquired by the acquiring portion.

(2)
The information processing apparatus according to (1), in which
the driving information includes information as to whether the driving device is being driven, and
the identifying portion identifies the information for determining the dictated position, by adjusting the detection information while the driving device is being driven.

(3)
The information processing apparatus according to (2), in which
the identifying portion identifies the information for determining the dictated position, by reducing an amount of change in the detection information while the driving device is being driven.

(4)
The information processing apparatus according to (2), in which
the driving information includes movement controlling information for controlling the movement imparted to the object by the driving device, and
the identifying portion identifies the information for determining the dictated position, by estimating, in accordance with the movement controlling information, a component due to the movement imparted by the driving device in the detection information, and subtracting the estimated component from the detection information.

(5)
The information processing apparatus according to (2), in which
the identifying portion identifies the information for determining the dictated position, by filtering the detection information using a filter that attenuates a frequency component of vibration imparted to the object by the driving device.

(6)
The information processing apparatus according to (5), in which
the driving information includes vibration controlling information for controlling the vibration imparted to the object by the driving device, and
the identifying portion identifies the information for determining the dictated position, by filtering the detection information using the filter corresponding to the vibration controlling information.

(7)
The information processing apparatus according to (6), in which
the identifying portion identifies the information for determining the dictated position, by selecting the filter from a plurality of potential filters in accordance with the vibration controlling information, and filtering the detection information using the selected filter, and
the information processing apparatus includes a storing portion that stores filter coefficient data applied to the potential filter determined beforehand for each piece of the vibration controlling information.

(8)
The information processing apparatus according to (6), in which
the identifying portion identifies the information for determining the dictated position, by generating the filter in accordance with the vibration controlling information, and filtering the detection information using the generated filter.

(9)

The information processing apparatus according to any one of (2) to (8), in which
the identifying portion identifies the information for determining the dictated position, by adjusting the detection information by a degree corresponding to a detection direction of the movement detection.

(10)

An information processing method including:
acquiring driving information for controlling a driving device that imparts movement to an object with an information processing apparatus; and
identifying information for determining a dictated position dictated by the object, on the basis of detection information obtained on the basis of movement detection of the object and the acquired driving information.

(11)

A program for causing a computer that controls an information processing apparatus to function as:
an acquiring portion that acquires driving information for controlling a driving device that imparts movement to an object; and
an identifying portion that identifies information for determining a dictated position dictated by the object, on the basis of detection information obtained on the basis of movement detection of the object and the driving information acquired by the acquiring portion.

REFERENCE SIGNS LIST 1 information processing system
5, 9 information network
10, 10-1, 10-2, 10-3, 10-4 dictating device
12 communication portion
14 control portion
16 display portion
20 display device
34 display control portion
54 vibrating unit control portion
90 information processing apparatus
102 input portion
104 vibrating portion
106, 906 detection information acquiring portion
108, 908 communication portion
110, 210, 910 adjusting portion
126 angular velocity information acquiring portion
128, 928 driving information acquiring portion
136 absolute angle information acquiring portion
142 CPU
144 ROM
146 RAM
148 bridge
150 bus
152 interface
154 input device
156 output device
158 storage device
160 communication device
250 estimating portion
310, 410 filtering portion
370 storing portion
450 generating portion

The invention claimed is:

1. An information processing apparatus, comprising:
a driving device that includes a vibrator, wherein the vibrator is configured to impart movement to an object; and
circuitry configured to:
recognize a marker on the object from an image of the object;
acquire detection information and driving information to control the driving device, wherein
the detection information is based on a movement detection of the object,
the detection information includes an angular velocity of the object in a roll direction and a motion of the object in a translational direction,
the motion in the translational direction of the object is based on a position and a size of the marker recognized on the object,
the driving information indicates whether the driving device is driven,
the driving information includes movement controlling information to control the movement imparted to the object by the vibrator, and
the movement controlling information indicates a value of voltage applied to the vibrator;
estimate a component of the movement imparted by the vibrator, wherein the estimation is based on:
multiplication of the value of the voltage with a conversion factor, and
division of a distance between a center of gravity of the object and the vibrator by the angular velocity of the object;
adjust, based on the estimated component of the movement imparted to the object by the vibrator, the detection information which includes the angular velocity of the object, wherein the adjustment includes a decrease in an amount of change in the angular velocity;
acquire first information that indicates an angle of the object, wherein the acquisition of the first information is based on an integration operation on the adjusted detection information; and
identify second information that determines a dictated position dictated by the object, wherein the second information is identified based on:
the acquired first information,
the adjustment of the detection information, and
the driving information.

2. The information processing apparatus according to claim 1, wherein
the circuitry is further configured to identify the second information that determines the dictated position by the decrease of the amount of change in the detection information, and
the decrease of the amount of change in the detection information is based on the indication the driving device is driven.

3. The information processing apparatus according to claim 1, wherein the circuitry is further configured to filter the detection information using a filter that attenuates a frequency component of vibration imparted to the object by the vibrator of the driving device.

4. The information processing apparatus according to claim 3, wherein
the driving information includes vibration controlling information to control the vibration imparted to the object by the vibrator of the driving device, and the circuitry is further configured to filter the detection information based on the filter corresponding to the vibration controlling information.

5. The information processing apparatus according to claim 4, wherein
the circuitry is further configured to:
select the filter from a plurality of potential filters based on the vibration controlling information; and
filter the detection information based on the selected filter, and
the information processing apparatus includes a storing portion configured to store filter coefficient data, for a potential filter of the plurality of potential filters, for each piece of the vibration controlling information.

6. The information processing apparatus according to claim 4, wherein the circuitry is further configured to:
generate the filter based on the vibration controlling information; and
filter the detection information based on the generated filter.

7. The information processing apparatus according to claim 1, wherein the circuitry is further configured to adjust the detection information by a degree corresponding to a detection direction of the movement detection.

8. An information processing method, comprising:
in an information processing apparatus:
acquiring detection information and driving information for controlling a driving device including a vibrator, wherein the vibrator imparts movement to an object;
recognizing a marker on the object from an image of the object, wherein
the detection information is based on a movement detection of the object,
the detection information includes an angular velocity of the object in a roll direction and a motion of the object in a translational direction,
the motion in the translational direction of the object is based on a position and a size of the marker recognized on the object,
the driving information indicates whether the driving device is driven,
the driving information includes movement controlling information to control the movement imparted to the object by the vibrator of the driving device, and
the movement controlling information indicates a value of voltage applied to the vibrator;
estimating a component of the movement imparted to the object by the vibrator, wherein the estimation is based on:
multiplication of the value of the voltage with a conversion factor, and
division of a distance between a center of gravity of the object and the vibrator by the angular velocity of the object;
adjusting, based on the estimated component of the movement imparted to the object by the vibrator, the detection information which includes the angular velocity of the object, wherein the adjustment includes a decrease in an amount of change in the angular velocity;

acquiring first information that indicates an angle of the object, wherein
the acquisition of the first information is based on an integration operation on the adjusted detection information; and
identifying second information for determining a dictated position dictated by the object, wherein the second information is identified based on:
the acquired first information,
the adjustment of the detection information, and
the driving information.

9. A non-transitory computer-readable medium having stored thereon, computer-executable instructions, which when executed by a computer, cause the computer to execute operations, the operations comprising:
acquiring detection information and driving information for controlling a driving device including a vibrator, wherein the vibrator imparts movement to an object;
recognizing a marker on the object from an image of the object, wherein
the detection information is based on a movement detection of the object,
the detection information includes an angular velocity of the object in a roll direction and a motion of the object in a translational direction,
the motion in the translational direction of the object is based on a position and a size of the marker recognized on the object,
the driving information indicates whether the driving device is driven,
the driving information includes movement controlling information to control the movement imparted to the object by the vibrator, and
the movement controlling information indicates a value of voltage applied to the vibrator;
estimating a component of the movement imparted by the vibrator based on:
multiplication of the value of the voltage with a conversion factor, and
division of a distance between a center of gravity of the object and the vibrator by the angular velocity of the object;
adjusting, based on the estimated component of the movement imparted to the object by the vibrator, the detection information which includes the angular velocity of the object, wherein the adjustment includes a decrease in an amount of change in the angular velocity;
acquiring first information that indicates an angle of the object, wherein
the acquisition of the first information is based on an integration operation on the adjusted detection information; and
identifying second information for determining a dictated position dictated by the object, wherein the second information is identified based on:
the acquired first information,
the adjustment of the detection information, and
the driving information.

* * * * *